United States Patent
Marlan et al.

(10) Patent No.: US 8,185,703 B2
(45) Date of Patent: May 22, 2012

(54) DETECTION AND CONTROL OF RESOURCE CONGESTION BY A NUMBER OF PROCESSORS

(75) Inventors: Gregory Marlan, San Jose, CA (US); Kenneth Yeager, Sunnyvale, CA (US); Mahdi Seddighnezhad, San Carlos, CA (US); David X. Zhang, San Jose, CA (US)

(73) Assignee: Silicon Graphics International Corp., Fremont, CA (US)

( * ) Notice: Subject to any disclaimer, the term of this patent is extended or adjusted under 35 U.S.C. 154(b) by 1089 days.

(21) Appl. No.: 10/631,988

(22) Filed: Jul. 31, 2003

(65) Prior Publication Data

US 2005/0027948 A1 Feb. 3, 2005

(51) Int. Cl.
*G06F 12/08* (2006.01)
(52) U.S. Cl. ............................. 711/150; 711/E12.016
(58) Field of Classification Search .................. 711/167, 711/168, 150
See application file for complete search history.

(56) References Cited

U.S. PATENT DOCUMENTS

| | | | | |
|---|---|---|---|---|
| 4,516,200 A | * | 5/1985 | Thompson | 709/217 |
| 4,893,248 A | * | 1/1990 | Pitts et al. | 705/400 |
| 5,930,820 A | * | 7/1999 | Lynch | 711/132 |
| 5,974,456 A | * | 10/1999 | Naghshineh et al. | 709/223 |
| 6,427,193 B1 | * | 7/2002 | Hughes et al. | 711/146 |
| 6,816,954 B2 | * | 11/2004 | Solomon | 711/167 |
| 6,898,751 B2 | * | 5/2005 | Aikawa et al. | 714/748 |
| 2002/0004842 A1 | * | 1/2002 | Ghose et al. | 709/235 |
| 2002/0009067 A1 | * | 1/2002 | Sachs et al. | 370/338 |
| 2002/0040421 A1 | * | 4/2002 | Muta | 711/125 |
| 2002/0150048 A1 | * | 10/2002 | Ha et al. | 370/231 |
| 2004/0165538 A1 | * | 8/2004 | Swami | 370/252 |

OTHER PUBLICATIONS

Nah-Oak Song, Byung-Jae Kwak, Jabin Song, L. E. Miller, "Enhancement of IEEE 802.11 Distributed Coordination Function with Exponential Increase Exponential Decrease Backoff Algorithm", Apr. 25 2003, The 57th IEEE Semiannual, vol. 4, pp. 2775-2778.*

"U.S. Appl. No. 10/631,988, Appeal Brief filed Mar. 14, 2011", 24 pgs.

* cited by examiner

*Primary Examiner* — Edward Dudek, Jr.
*Assistant Examiner* — Ryan Dare
(74) *Attorney, Agent, or Firm* — Morgan, Lewis & Bockius LLP

(57) ABSTRACT

In an embodiment, a system includes a resource. The system also includes a first processor having a load/store functional unit. The load/store functional unit is to attempt to access the resource based on access requests. The first processor includes a congestion detection logic to detect congestion of access of the resource based on a consecutive number of negative acknowledgements received in response to the access requests prior to receipt of a positive acknowledgment in response to one of the access requests within a first time period.

46 Claims, 21 Drawing Sheets

DETECTION AND CONTROL OF RESOURCE CONGESTION BY A NUMBER OF PROCESSORS

TECHNICAL FIELD

This invention relates generally to electronic data processing and more particularly, to detection and control of resource congestion by a number of processors.

BACKGROUND

Multiprocessor computer systems have long been valued for the high performance they offer by utilizing multiple processors that are not individually capable of the same high level of performance as the multiprocessor system. In such multiprocessor systems, tasks are divided among more than one processor, such that each processor does a part of the computation of the system. Therefore, more than one task can be carried out at a time with each task or thread running on a separate processor, or a single task can be broken up into pieces that can be assigned to each processor. Multiprocessor systems incorporate many methods of dividing tasks among their processors, but all benefit from the ability to do computations on more than one processor simultaneously.

Traditionally, multiprocessor systems were large mainframe or supercomputers with several processors mounted in the same physical unit. Modern multiprocessor systems include arrays of interconnected computers or workstations that divide large tasks among themselves in much the same way as the processors of traditional mainframe systems, and achieve similarly impressive results. Many multiprocessor computer systems have a combination of theses attributes, such as a group of multiprocessor systems that are interconnected.

With multiple processors and multiple computational processes within a multiprocessor system, a mechanism is needed for allowing processors to share access to data and share the results of their computations. Centralized memory systems use a single central bank of memory that all processors can access, such that all processors can access the central memory at roughly the same speed. Still other systems have distributed or independent memory for individual processors or groups of processors and provide faster access to memory that is local to each processor or group of processors, but access to data from other processors takes somewhat longer than in shared memory systems.

The memory, whether centralized or distributed, can further be shared or multiple address type memory. Shared address memory systems allow multiple processors to access the same memory, whether distributed or centralized, to communicate with other processors via data stored in the shared memory. Multiple address memory incorporates separate memory for each processor or group of processors, and does not allow access to this local memory to other processors. Such multiple address or local memory systems must rely on messages to share data between processors. Cache memory can be utilized in any of these memory configurations to attempt to provide faster access to data each processor is likely to need and to reduce requests for the same commonly used data from multiple processors on the system bus.

Cache in a multiple address system simply caches data from the local memory, but cache in a shared address system typically caches memory from any of the shared memory locations, whether local or remote from the processor requesting the data. The cache associated with each processor or group of processors in a distributed shared memory system likely maintains copies of data from memory local to a number of other processor nodes. Information about each block of memory is kept in a directory, which keeps track of data such as which caches have copies of the block, whether the cache is dirty, and other related data. The directory is used to maintain cache coherency, or to ensure that the system can determine whether the data in each cache is valid. The directory is also used to keep track of which caches hold data that is to be written, and facilitates granting exclusive write access to one processor or I/O device. After write access has been granted and a memory location is updated, the cached copies are marked as dirty.

As described, multiple processors may attempt to access the same data from a same memory. Therefore, such systems use a request/acknowledgment protocol. In particular, if a processor is to access data from a shared memory, the processor submits an access request. If the data is accessible, the memory controller responds with an acknowledgment (ACK) along with the data. Conversely, if the data is not accessible, the memory controller responds with a negative acknowledgement (NACK). However, such a protocol may introduce congestion into the system.

To illustrate, multiple processors may attempt to access a same cache line in a cache memory. Therefore, the access request by one processor is granted, while the access requests by the other processors are denied. Typically, these other processors continue to request access to such data until the access is granted. Accordingly, system resources become congested with the multiple retry requests for access to data, which includes multiple access requests and NACKS in response to such requests.

SUMMARY

Apparatus, systems and methods for detection and control of resource congestion by a number of processors are described. In an embodiment, processors in a multi-processor system transmit requests for lines of data in different memories and detect congestion of access to such lines of data based on the type of responses (negative acknowledgments (NACKs) or positive acknowledgements (ACKs)). In one embodiment, hardware that is internal to the processors detects such congestion after receipt of a repeated number of NACKs in response to requests for a line of data. In an embodiment, hardware that is internal to the processors regulates access to congested lines of data. In one embodiment, such hardware increases the time between retries for access to congested lines of data as the number of NACKs increase. A system that incorporates embodiments of the invention may include a large number of processors that are attempting to access a same line of data based on such requests. Accordingly, embodiments of the invention preclude the overloading of the interconnects (that couple the multi-processor system together) with repeated requests and responses thereto to a line of data that is congested.

In one embodiment, a system includes a cache memory to store data. The system also includes a first processor to attempt to access the data from the cache memory based on access requests. The first processor includes a congestion detection logic to detect congestion of access to the data based on receipt of a consecutive number of negative acknowledgements in response to the access requests.

In an embodiment, a system includes a resource. The system also includes a first processor having a load/store functional unit. The load/store functional unit is to attempt to access the resource based on access requests. The first processor includes a congestion detection logic to detect congestion of access of the resource based on a consecutive number of negative acknowledgements received in response to the access requests prior to receipt of a positive acknowledgment in response to one of the access requests within a first time period.

In one embodiment, a system includes a cache memory to include a number of cache lines for storage of data. The system also includes at least two processors, wherein a first processor of the at least two processors is to attempt to access the data in one of the number of cache lines based on access requests. The first processor includes a congestion detection logic to detect congestion of access of a first cache line of the number of cache lines based on a ratio of a number of negative acknowledgments to a number of positive acknowledgments received in response to the access requests.

In one embodiment, an apparatus includes a load/store unit that includes a retry logic that is to retry access to a resource after receipt of a negative acknowledgement for an attempt to access the resource by the load/store unit. The apparatus also includes a congestion detection logic to output a signal that indicates that the resource is congested based on receipt of a consecutive number of negative acknowledgments in response to access requests to the resource.

In one embodiment, a processor includes a functional unit to attempt to access data from memory coupled to the processor based on an access request. The functional unit is to retry attempts to access of the data based on other access requests after receipt of a negative acknowledgement in response to the attempt to access the data. The processor also includes a congestion detection logic to detect congestion of access of the data based on receipt of a consecutive number of negative acknowledgments that exceed a threshold prior to access of the data. The processor also includes a congestion control logic to disable the functional unit from the attempts to access the data for a time period after congestion is detected.

In an embodiment, a processor includes a functional unit to attempt to access a cache line in a cache memory coupled to the processor based on an access request. The functional unit is to retry attempts to access the cache line based on additional access requests after receipt of a negative acknowledgement in response to the attempt to access the data. The processor also includes a congestion detection logic to detect congestion of access of the cache line based on an average number of negative acknowledgments received that exceed a threshold prior to access of the data. The processor also includes a congestion control logic to disable the functional unit from attempts to access the cache line for a time period after congestion is detected.

In one embodiment, a system includes a cache memory to store data. The system also includes a first processor to attempt to access the data from the cache memory based on access requests. The first processor includes a congestion detection logic to detect congestion of access to the data based on receipt of a consecutive number of negative acknowledgements in response to the access requests.

In an embodiment, a system includes a resource. The system also includes a first processor having a load/store functional unit. The load/store functional unit is to attempt to access the resource based on access requests. The first processor includes a congestion detection logic to detect congestion of access of the resource based on a consecutive number of negative acknowledgements received in response to the access requests prior to receipt of a positive acknowledgment in response to one of the access requests within a first time period.

In one embodiment, a system includes a cache memory to include a number of cache lines for storage of data. The system also includes at least two processors, wherein a first processor of the at least two processors is to attempt to access the data in one of the number of cache lines based on access requests. The first processor includes a congestion detection logic to detect congestion of access of a first cache line of the number of cache lines based on a ratio of a number of negative acknowledgments to a number of positive acknowledgments received in response to the access requests.

In an embodiment, a method includes transmitting access requests, by a first processor, to access data in a memory. The method also includes receiving a positive acknowledgement or a negative acknowledgment from a second processor that is associated with the memory based on one of the number of access requests. The method includes detecting congestion of the data based on receipt, by the first processor, of a consecutive number of negative acknowledgements that exceed a first threshold, prior to receipt, by the first processor, of a positive acknowledgment.

In one embodiment, a method includes accessing, by at least one processor, a resource based on an access request. The method also includes receiving a positive acknowledgement if the resource is accessible. Additionally, the method includes receiving a negative acknowledgement if the resource is not accessible. The method includes retrying accessing, by the at least one processor, of the resource based on a number of access requests. The method includes detecting that a consecutive number of negative acknowledgements exceeds a first threshold within a time period, prior to receiving a positive acknowledgments.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings:

FIGS. 16A-16I illustrate the value an averaging window shift register (as an eight-bit shift register) over time, according to one embodiment of the invention.

DETAILED DESCRIPTION

Figure 1:
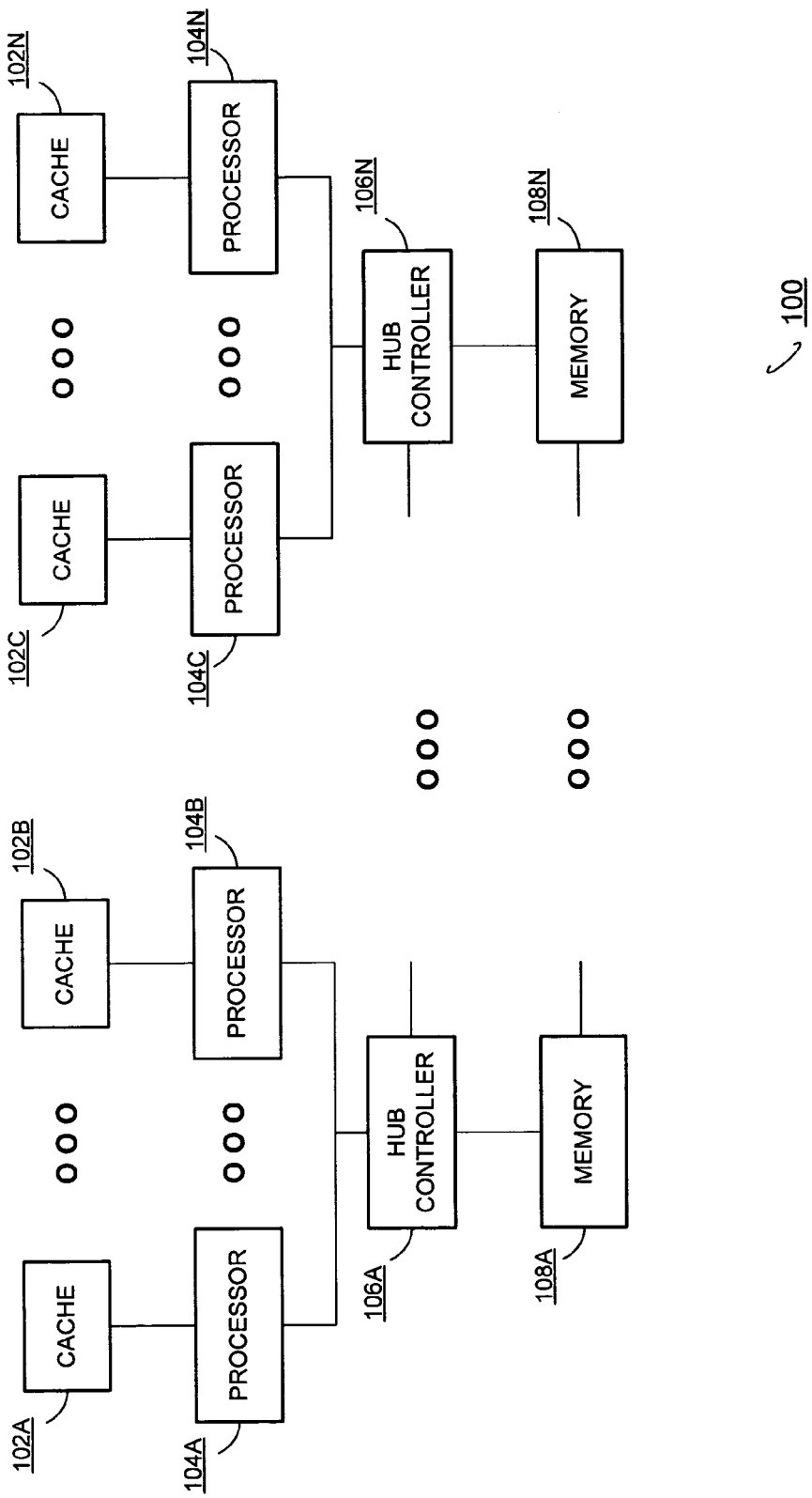
FIG. 1 illustrates a system for detection and control of resource congestion by a number of processors, according to one embodiment of the invention.

Methods, apparatuses and systems for detection and control of resource congestion by a number of processors are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)). In some embodiments, a computer storage medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for detection and control of resource congestion by a number of processors, in accordance with embodiments of the invention. A number of figures show flow diagrams illustrating operations for detection and control of resource congestion by a number of processors. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

System Description

FIG. 1 illustrates a system for detection and control of resource congestion by a number of processors, according to one embodiment of the invention. In particular, FIG. 1 illustrates a system 100 that includes a number of cache memories 102A-102N, a number of processors 104A-104N, a number of hub controllers 106A-106N, a number of memories 108A-108N. Each one of the processors 104A-104N are associated with and coupled to one of the cache memories 102A-102N.

The processor 104A is associated with and coupled to the cache memory 104A; the processor 104B is associated with and coupled to the cache memory 102B; the processor 104C is associated with and coupled to the cache memory 102C; the processor 104N is associated with and coupled to the cache memory 102N. The hub controller 106A is coupled to the processors 104A-104B. The hub controller 106N is coupled to the processors 104C-104N. The hub controller 106A is coupled to the memory 108A. The hub controller 106N is coupled to the memory 108N. The cache memories 102A-102N include a number of cache lines for storage of blocks of data therein. The hub controllers 106A-106N are coupled together.

The processors 104A-104N may be different types of general purpose application processors. The processors 104A-104N may execute different types of instructions. In one embodiment, the cache memories 102A-102N may be different types of cache in a unified or a split cache configuration. For example, in a split cache configuration, the cache memory 102 may be an instruction cache or a data cache. In an embodiment, the cache memory may be different levels of cache (e.g., L1, L2, etc.) in a multi-level cache configuration. In one embodiment, the cache memory 102 may be a directed-mapped cache or an n-way set-associative cache. While the memories 108A-108N may be of any suitable type of memory, in an embodiment, the memories 108A-108N are different types of Random Access Memory (RAM) (e.g., Synchronous RAM (SRAM), Synchronous Dynamic RAM (SDRAM), Dynamic RAM (DRAM), Double Data Rate (DDR)-SDRAM, etc.) of varying size.

Any of the number of processors 104A-104N may access data from cache lines in any of the cache memories 102A-102N through the hub controllers 106A-106N. The hub controllers 106A-106N includes a directory that stores identifications of which data is stored in the different cache lines of the different cache memories 102A-102N and the state of these cache lines. For example, in one embodiment, a same data may be stored in different cache lines in different cache memories 102A-102N. Therefore, the state of such cache lines is "shared." If the data in a cache line is to be updated, the state of this cache line within the directory is changed to an "exclusive" state. Accordingly, if a shared cache line is to be updated by its associated processor 104, the processors 104 associated with the other cache memories 102 that have shared copies of this cache line invalidate their cache lines, thereby leaving one valid copy of the cache line.

Therefore, if the processor 104N needs to access data from a cache line in the cache 102A, the processors 104N transmits a request for this cache line to the hub controller 106N. The hub controller 106N performs a lookup in its directory to determine which of the caches 102A-102N have this cache line stored and the state of such cache lines. Upon determining that the data is stored in the cache memory 102A, the hub controller 106N forwards the request to the hub controller 106A. The hub controller 106A forwards the access request for the data in the cache memory 102A to the processor 104A. If the cache line is accessible (not being written to or read from), the processor 104A returns an acknowledgment (ACK) along with the data in the cache line. If the cache line is not accessible, the processor 104A returns a negative acknowledgement (NACK). The hub controller 106A then returns the ACK (and the data) or NACK back to the processor 102N.

In an embodiment, congestion may occur with regard to access of one of the cache lines in the cache memories 102A-102N by a multiple number of the processors 104A-104N. For example, if a multiple number of the processors 104A-104N are attempting to read a same cache line in the cache 102A, only one of these accessing processors 104 is able to access the cache line. Such processor receives a positive acknowledgement (ACK) and accesses the cache line. The other processors attempting to access this cache line receive a negative acknowledgement (NACK) and are unable to access this cache line. Such processors may attempt to retry accessing this cache line. As further described below, in an embodiment, the number of processors 104A-104N may include logic for detection and control of congestion with regard to accessing resources, such as a cache line.

Figure 2:
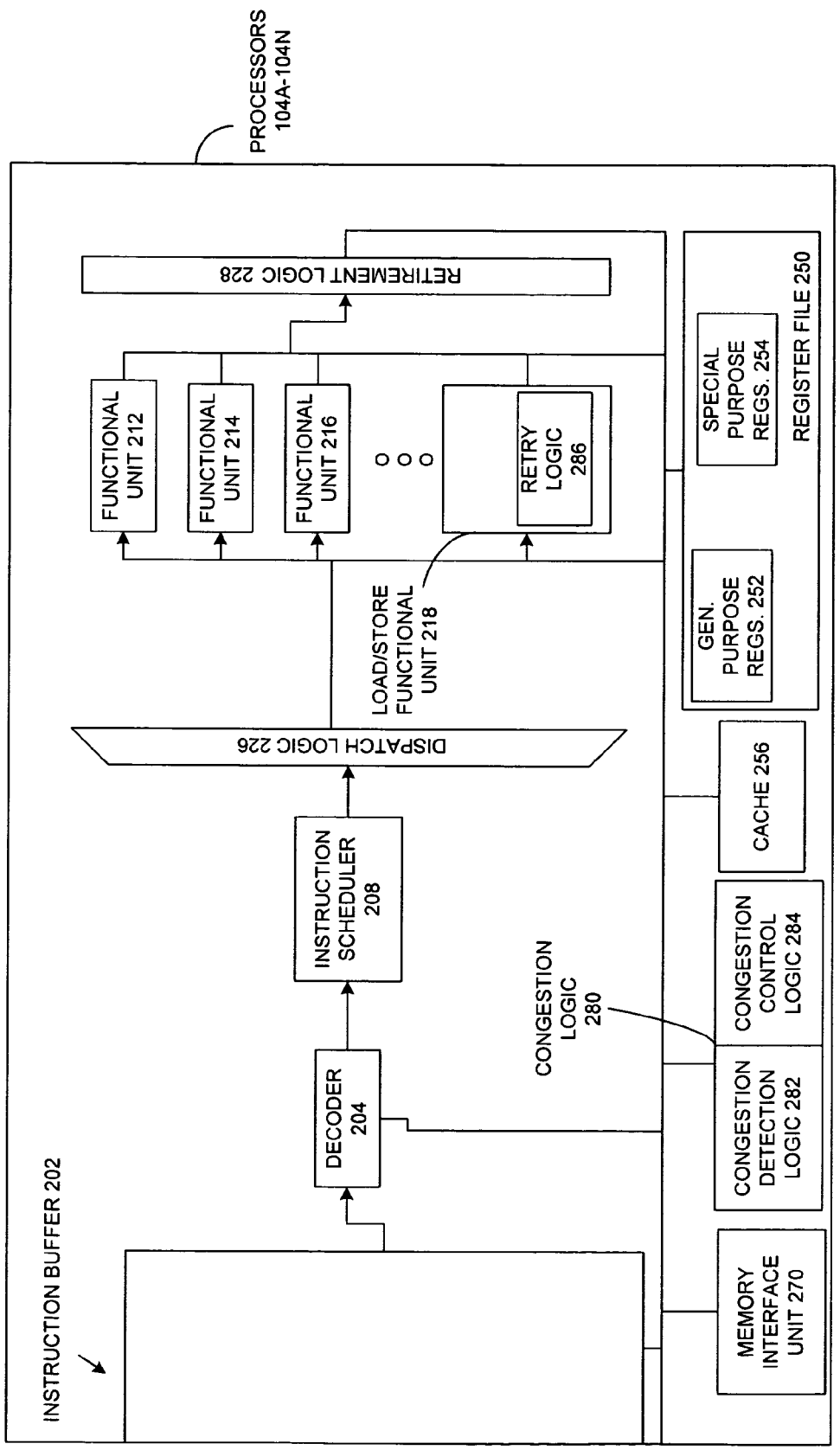
FIG. 2 illustrates a more detailed block diagram of a processor, according to one embodiment of the invention.

FIG. 2 illustrates a more detailed block diagram of a processor, according to one embodiment of the invention. In particular, FIG. 2 illustrates a more detailed block diagram of one of the processors 104A-104N. As shown, memory interface unit 270 is coupled to cache 256, register file 250 (that includes general purpose registers 252 and special purpose registers 254) and instruction buffer 202, such that memory interface unit 270 can retrieve macro instructions and associated operands and store such data into instruction buffer 202 and cache 256, general purpose registers 252 and/or special purpose registers 254. Additionally, cache 256 and register file 250 are coupled to decoder 204, functional units 212-218 and retirement logic 228. The processor 104 also includes a congestion logic 280 that includes a congestion detection logic 282 and a congestion control logic 284.

As further described below, operations for the congestion detection and congestion control include a number of configurable values. In one embodiment, the special purpose registers 254 include a number of registers for storage of such configuration data. For example, such configuration data may store a value for an initial delay for a time period for controlling the congestion. The configuration data may also include different thresholds (such as NACK and ACK thresholds), Boolean values for different shift operations, etc.

Decoder 204 is coupled to instruction buffer 202, such that decoder 204 retrieves the instructions from instruction buffer 202. Decoder 204 can receive these instructions and decode each of them to determine the given instruction and also to generate a number of instructions in an internal instruction set. For example, in one embodiment, the instructions received by decoder 204 are termed macro instructions, while the instructions that are generated by decoder 204 are termed micro instructions (or micro-operations). Decoder 204 is also coupled to instruction scheduler 208, such that instruction scheduler 208 can receive these micro-operations for scheduled execution by functional units 212-218.

Instruction scheduler 208 is coupled to dispatch logic 226, such that the instruction scheduler 208 transmits the instructions to be executed by functional units 212-218. Dispatch logic 226 is coupled to functional units 212-216 and a load/store functional unit 218 such that dispatch logic 226 transmits the instructions to functional units 212-218 for execution.

Functional units 212-218 can be one of a number of different execution units, including, but not limited to, an integer arithmetic logic unit (ALU), a floating-point unit, memory load/store unit, etc. Functional units 212-218 are also coupled to retirement logic 228, such that functional units 212-218 execute the instructions and transmit the results to retirement logic 228. Retirement logic 228 can transmit these results to memory that can be internal or external to processor 104, such as registers within register file 250 or cache 256, one of the caches 105A-105N, the memory 112, etc.

The load/store functional unit 218 loads data into the processor 104 from an external memory (e.g., one of the cache memories 102) and stores data into an external memory from the processor 104 based on execution of load and store instructions, respectively. As shown, the load/store functional unit 218 includes a retry logic 286. During operation, if the load/store functional unit 218 attempts to access a resource (such as a cache line in one of the cache memories 102) and receives a NACK, the retry logic 286 attempts to again access the resource. Accordingly, the retry logic 286 attempts to access the resource until an ACK is received. In other words, the retry logic 286 causes the re-execution of the load or store instruction by the load/store functional unit 218 when a NACK is received.

In an embodiment, the congestion control logic 284 transmits a command to the retry logic 286 to stop attempting the access (through a disable retry signal 307, which is described in more detail below). After a given time period, the congestion control logic 284 may also issue a different command (through the disable retry signal 307) to the retry logic 286 to allow the retry logic 286 to attempt to access the resource. One embodiment of the input/output communications of the congestion logic 280 and the retry logic 286 is now described in conjunction with FIG. 3.

Figure 3:
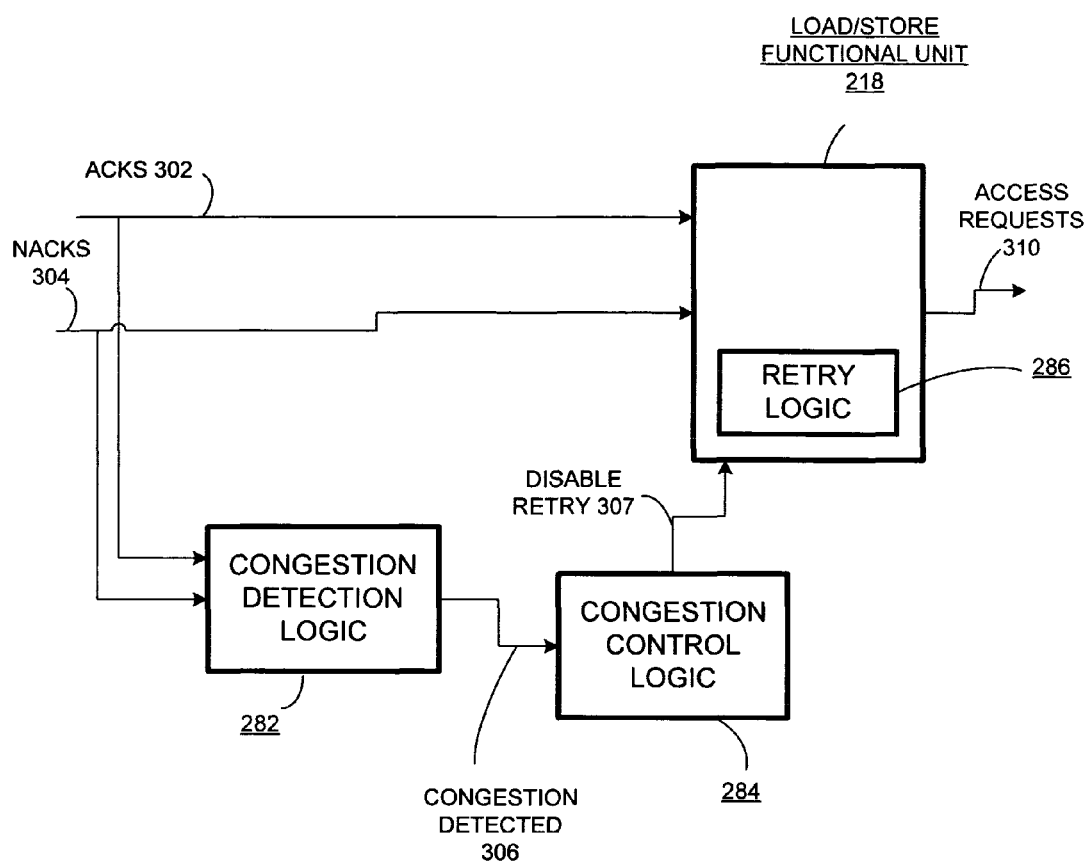
FIG. 3 illustrates the input/output communications of a load/store functional unit and a congestion logic, according to one embodiment of the invention.

FIG. 3 illustrates the input/output communications of a load/store functional unit and a congestion logic, according to one embodiment of the invention. FIG. 3 illustrates one embodiment of the input/output communications of the load/store functional unit 218 (that includes the retry logic 286), the congestion detection logic 282 and the congestion control logic 284. The load/store functional unit 218 transmits a first access request 310 to access a resource (such as a cache line within one of the cache memories 102). If the resource cannot be accessed, the retry logic 286 attempts to continue to access this resource. The retry logic 286 and the congestion detection logic 282 are coupled to receive ACKS 302 and the NACKS 304 in response the access requests 310.

If the congestion detection logic 282 determines that there is congestion with regard to accessing a resource, the congestion detection logic 282 outputs a congestion detected signal 306, which is inputted into the congestion control logic 284. The congestion detection logic 282 determines whether congestion is occurring with regard to the resource attempting to be accessed by on the ACKS and NACK received. The congestion detection logic 282 may make this determination based on a number of different logic and operations.

A number of different embodiments of the congestion detection logic 282 are described in more detail below in conjunction with FIGS. 6, 8, 10, 12 and 14. In one embodiment, one or more of the congestion detection logic 282 illustrated in FIGS. 6, 8, 10, 12 and 14 are within the congestion detection logic 282. Accordingly, one or more of such logic may be used to determine if congestion is detected. In one embodiment, the different types of logic used within the congestion detection logic 282 is dependent on the system configuration, the applications being executed therein, etc. For example, the logic selected for detection may be different for the system 100 having two processors in comparison to the system 100 having 50 processors. Moreover, the logic selected for detection may be different for the system 100 executing applications that include a relatively large amount of loads and stores in comparison to the system 100 executing applications that include a relatively small amount of loads and stores. In one embodiment, the type of detection operation(s) used by the congestion detection logic 282 are configurable. In an embodiment, a value within a register within the special purpose registers 254 is set, which indicates the type of detection operation(s).

The congestion control logic 284 outputs a value through the disable retry signal 307 that is inputted to the retry logic 286. As further described below, depending on such value, the retry logic 286 may or may not be precluded from outputting an access request 310 for accessing a given resource.

Figure 4:
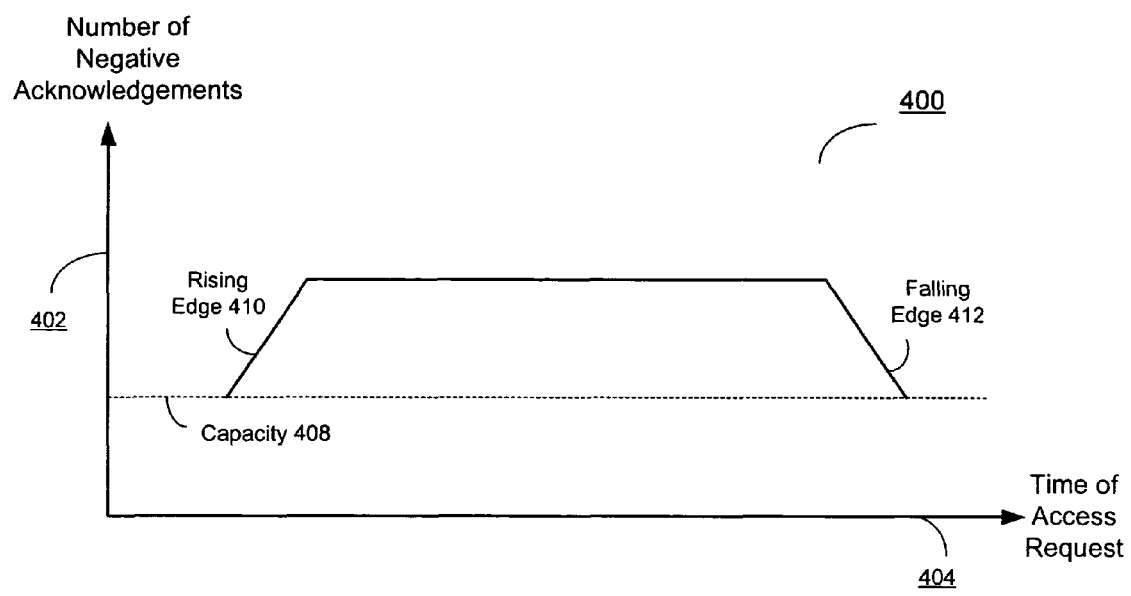
FIG. 4 illustrates a one dimensional network congestion model based on the number of NACKs, according to one embodiment of the invention.

FIG. 4 illustrates a one dimensional network congestion model based on the number of NACKs, according to one embodiment of the invention. As shown, FIG. 4 illustrates a graph of the number of NACKs received in response to access requests to a resource in reference to the time of the access requests, according to one embodiment of the invention. A y-axis 402 of a graph 400 represents the number of NACKs received in response to an attempt to access a resource (e.g., one of the cache lines in one of the cache memories 102). An x-axis 404 of the graph 400 represents the time of access requests. A capacity line 408 represents the amount of capacity of the resource such that there is congestion with regard to accessing the resource beyond such point.

A rising edge 410 represents a rapid increase in the number of NACKs received back from the resource, because the capacity to process the access requests has been exceeded. A falling edge 412 represents a rapid decrease in the number of NACKs received back from the resource. A network congestion storm begins at the rising edge 410 when a number of the processors 104A-104N attempt to access a shared resource. As shown, when the number of accesses is greater than the capacity of the system 100, the number of NACKs increases. In turn, the memory latency would be longer with increasing number of NACKs, and the longer memory latency in turn would saturate buffers within the processors 104 (not shown) more quickly and thereby generate more NACKs. Such feedback may cause the rising edge 410 to be much steeper.

Figure 5:
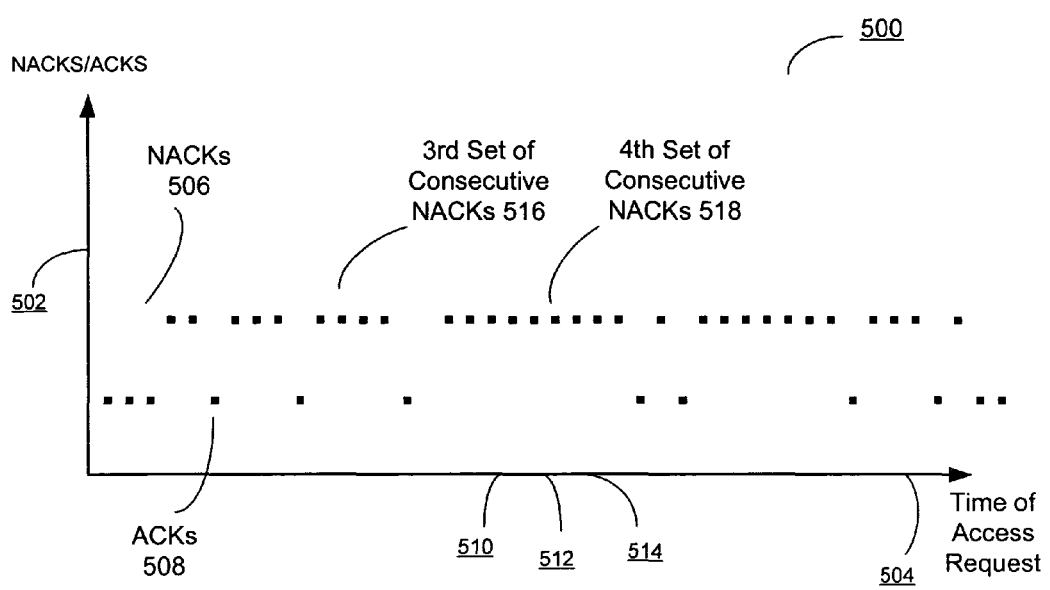
FIG. 5 illustrates a one dimensional network congestion model based on the number of NACKs and ACKs, according to another embodiment of the invention.

FIG. 5 illustrates a one dimensional network congestion model based on the number of NACKs and ACKs, according to another embodiment of the invention. As shown, FIG. 5 illustrates a graph 500 of the receipt of ACKs and NACKs in response to access requests in reference to the time of the access requests, according to one embodiment of the invention.

A y-axis 502 of the graph 500 represents the NACKs and ACKs received in response to an attempt to access a resource (e.g., one of the cache lines in one of the cache memories 105). An x-axis 504 of the graph 500 represents the time of access requests. The NACKs line 506 represents the NACKs received from the resource. The ACKs line 508 represents the ACKs received from the resource. As shown, the NACKs line 506 includes a number of sets of consecutive NACKs (including a third set of consecutive NACKs 516 and a fourth set of consecutive NACKs 518). A time point 510, a time point 512 and a time point 514 are different points in time for access requests. Different embodiments for apparatus and operations for detection of the rising edge 419 are described in more detail below in conjunction with FIGS. 6-15.

Congestion Detection Description

FIGS. 6, 8, 10, 12 and 14 illustrate different embodiments for the detection of memory congestion/contention in a multi-processor system. In particular, FIGS. 6, 8, 10, 12 and 14 illustrate different apparatus for detecting the rising edge 410, according to different embodiments of the invention. FIGS. 7, 9, 11, 13 and 15 illustrate different operations for detecting the rising edge 410, according to different embodiments of the invention. The operations of FIGS. 6, 8, 10, 12 and 14 are described with reference to attempt to access a cache line from one of the cache memories 102. However, embodiments of the invention may be used to access a number of other different resources (e.g., the memory 108, a secondary storage device, etc.).

A first embodiment of the congestion detection logic 282 is now described that detects congestion based on the consecutive number of NACKs received in response to an access request to a resource. Such an embodiment allows for accurate detection for a worst storm of congestion with regard to the number of NACKs received.

Figure 6:
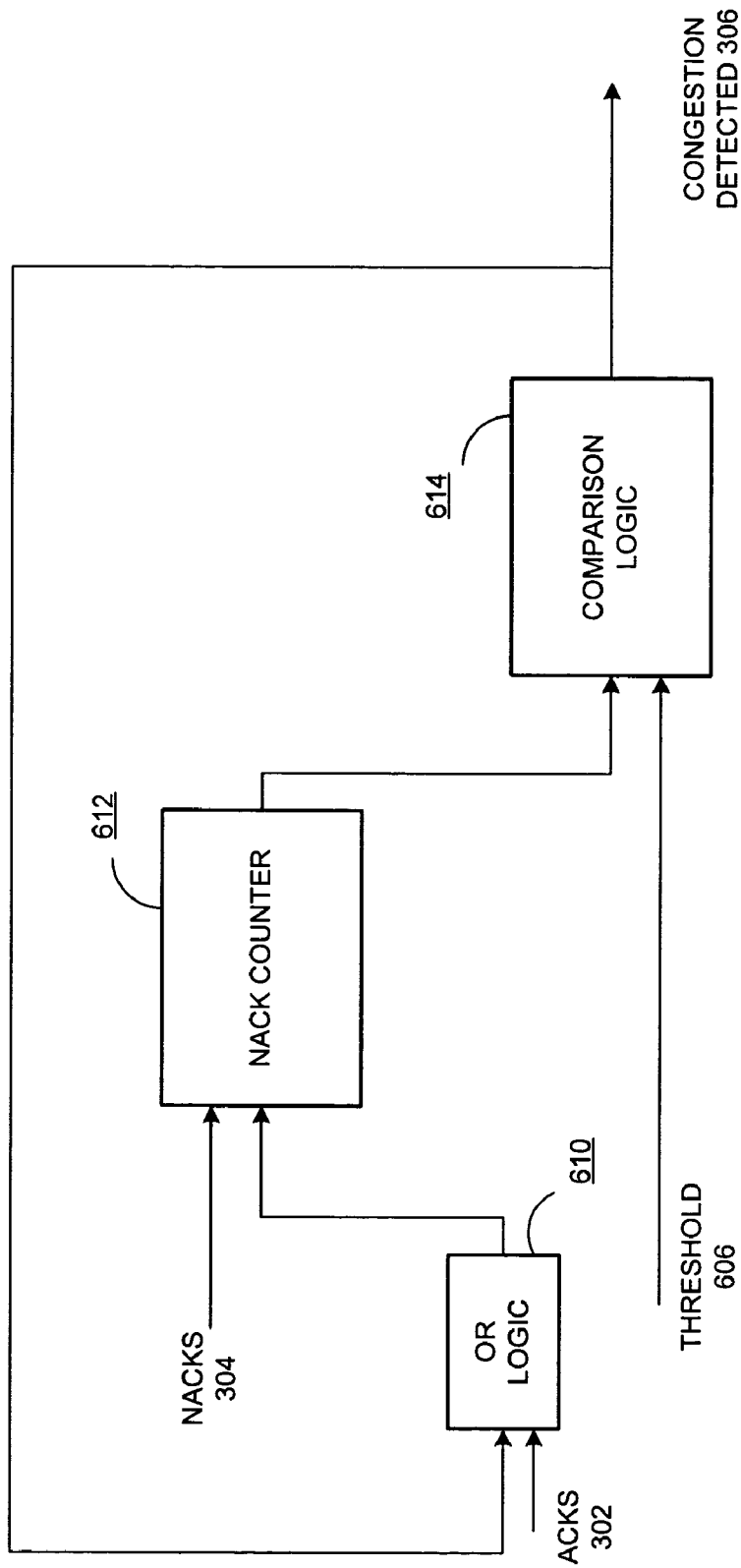
FIG. 6 illustrates a congestion detection logic for detecting congestion based on whether a consecutive number of negative acknowledgements received in response to access requests exceeds a threshold, according to one embodiment of the invention.

In particular, FIG. 6 illustrates a congestion detection logic for detecting congestion based on whether a consecutive number of negative acknowledgements received in response to access requests exceeds a threshold, according to one embodiment of the invention. The congestion detection logic 282 includes an OR logic 610, a NACK counter 612 and a comparison logic 614. An ACKs signal 302 and the congestion detected signal 306 are coupled as inputs into the OR logic 610. An output of the OR logic 610 is coupled to the reset input of the NACK counter 612. The NACKs signal 304 is coupled to a data input of the NACK counter 612. An output of the NACK counter 612 is coupled as a first input of the comparison logic 614. A threshold signal 606 is coupled as a second input into the comparison logic 614. The output of the comparison logic 614 is the congestion threshold signal 306.

Figure 7:
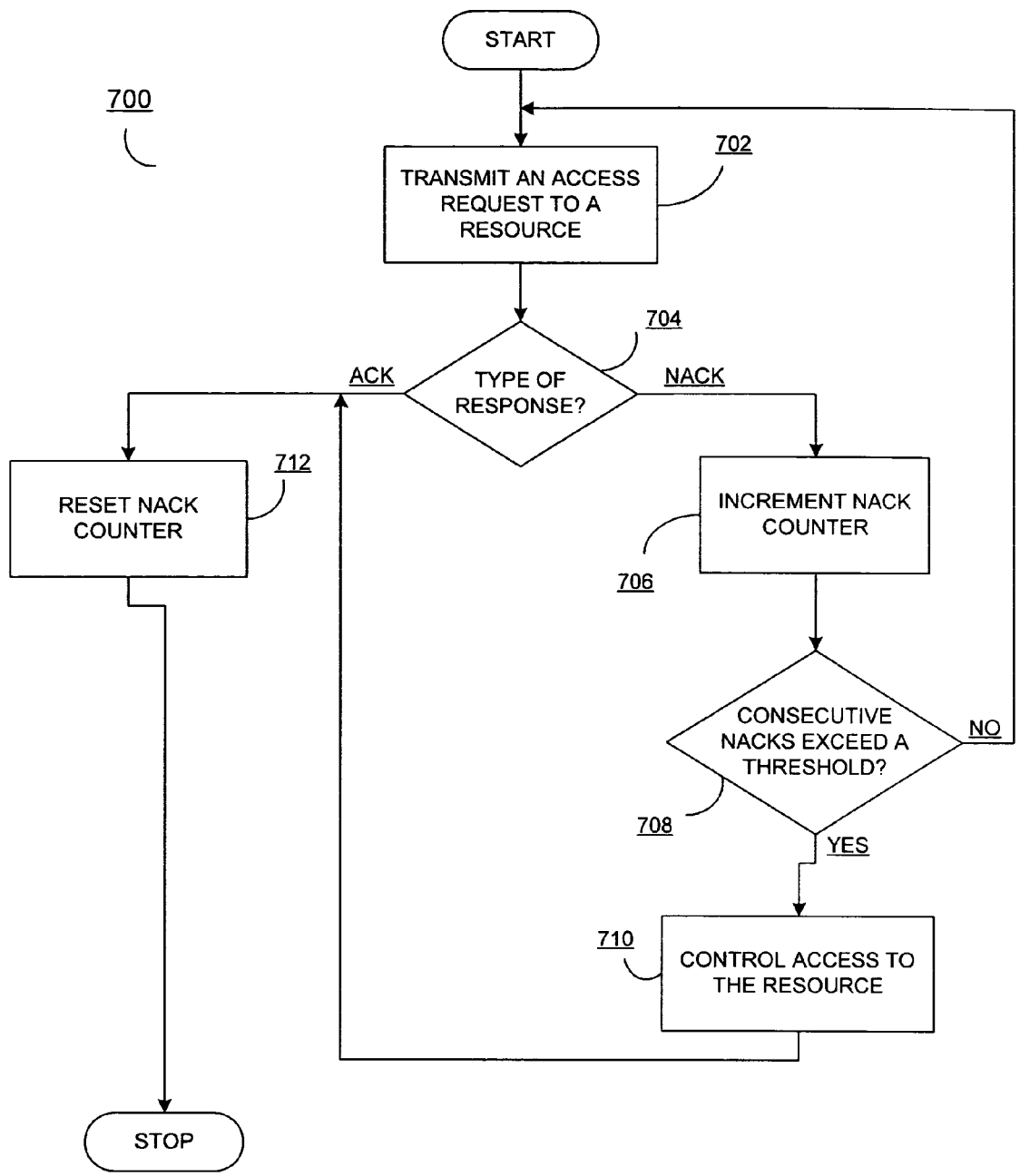
FIG. 7 illustrates a flow diagram for detecting congestion based on a consecutive number of NACKs received in response to access requests, according to one embodiment of the invention.

The operations of the congestion detection logic 282 illustrated in FIG. 6 will now be described with reference to FIG. 7. FIG. 7 illustrates a flow diagram for detecting congestion based on a consecutive number of NACKs received in response to access requests, according to one embodiment of the invention.

In block 702 of the flow diagram 700, an access request is transmitted to a resource. With reference to FIG. 3, the load/store functional unit 218 transmits an access request to one of the cache lines within one of the cache memories 102. As described above, the access request may be routed through a local hub controller 106 coupled to the requesting processor 104 to a remote hub controller 106. The remote hub controller 106 forwards the request to the processor 104 associated with the cache memory 102 that includes the cache line that is being requested. Control continues at block 704.

In block 704, a determination is made of the type of response received in response to the access request. With reference to the embodiment illustrated in FIG. 3, the congestion detection logic 282 and the retry logic 286 receive the response to the access request. The congestion detection logic 282 determines the type of response received in response to the access request. In particular, the congestion detection logic 282 determines whether the response is an ACK or a NACK based on whether the response is received on the ACKs signal 302 or the NACKs signal 304. Upon determining that the type of response is an ACK, control continues at block 712, which is described in more detail below.

In block 706, upon determining that the type of response is a NACK, the NACK counter is incremented. With reference to the embodiment illustrated in FIG. 6, the NACK counter 612 is incremented in response to receiving a NACK on the NACKs signal 304. Control continues at block 708.

In block 708, a determination is made of whether a consecutive number of NACKs have exceeded a threshold. With reference to the embodiment illustrated in FIG. 6, the NACK counter 612 counts the consecutive number of NACKs received back from the resource through the NACKs signal 304. The NACK counter 612 outputs the current value of the number of NACKs to the comparison logic 614. The comparison logic 614 compares the current value of the number of NACKS to a threshold received from the threshold signal 606. The threshold from the threshold signal 606 is a configurable value that may vary based on the configuration of the system 100. For example, if the system 100 includes ten processors instead of three, the threshold may be smaller. Upon determining that the consecutive number of NACKs has not exceeded the threshold, the operations of the flow diagram 700 continue at block 702, wherein another access request is made by the retry logic 286 (in the load/store functional unit 218).

In block 710, upon determining that the consecutive number of NACKs has exceeded the threshold, access to the resource is controlled. With reference to the embodiment illustrated in FIG. 6, the comparison logic 614 generates the congestion detected signal 306. With reference to the embodiment illustrated in FIG. 3, the congestion detection logic 282 outputs an indication on the congestion detected signal 306 to the congestion control logic 284 that indicates that there is congestion with reference to access of this resource. As described in more detail below, the congestion control logic 284 precludes the retry logic 286 from retrying the accessing of the resource from a given period of time. Control continues at block 712.

In block 712, the NACK counter is reset. With reference to the embodiment illustrated in FIG. 6, the OR logic 610 outputs a logical high to the reset input of the NACK counter 612 if either congestion is detected (on the congestion detected signal 306) or if an ACK is received on the ACKS signal 302. Accordingly, a consecutive count of the number of NACKS is reset if either an ACK is received or congestion is detected. The operations of the flow diagram 700 are complete.

Another embodiment of the congestion detection logic 282 is now described. Such an embodiment detects congestion based on the consecutive number of NACKs received in response to an access request to a resource within a given time period. Returning to FIG. 4, this embodiment of the congestion detection logic 282 detects the change (the rising edge 410) of the consecutive number of NACKs. In such an embodiment, there is congestion if the consecutive number of NACKs detected exceeds a threshold.

Figure 8:
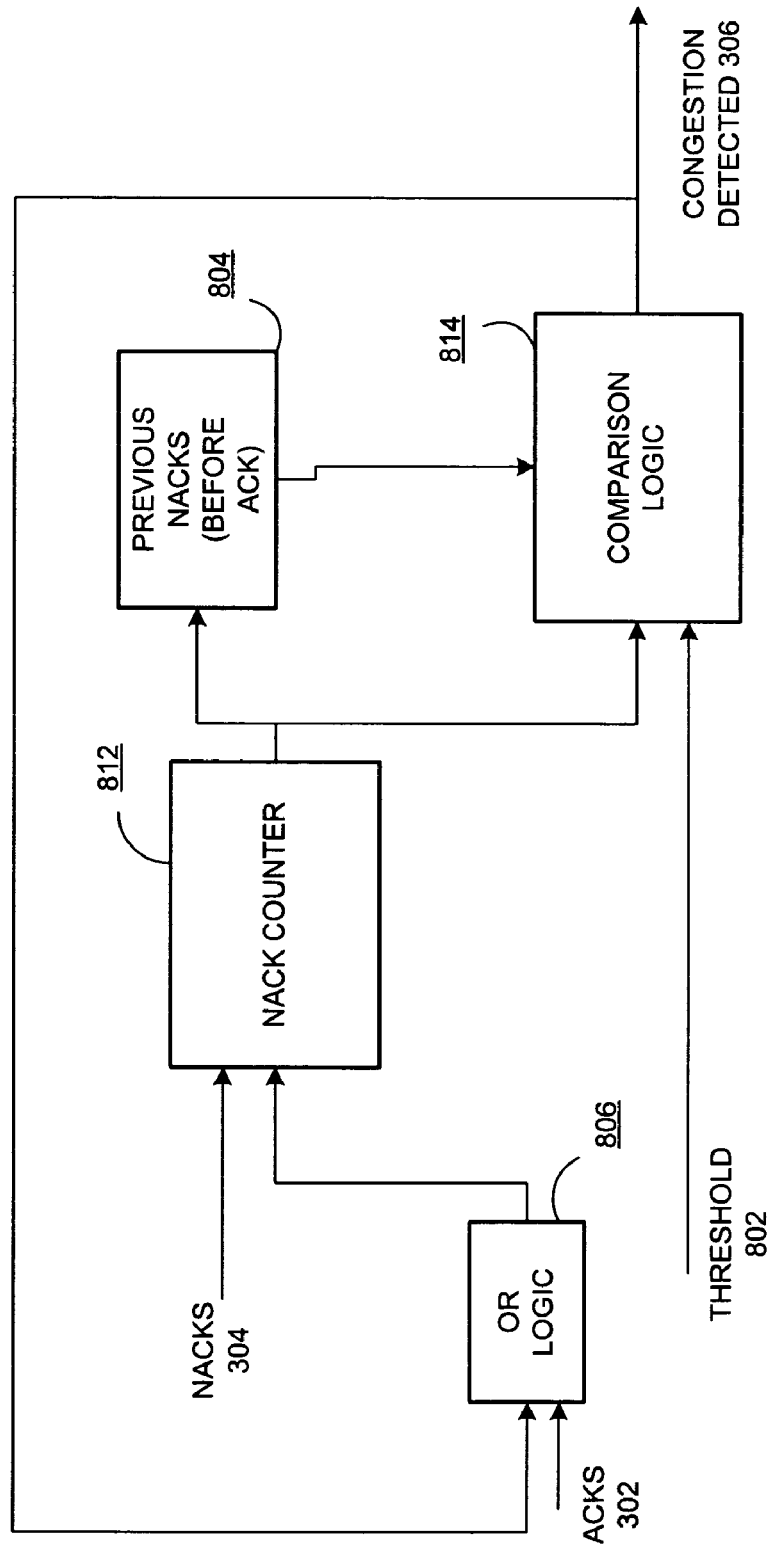
FIG. 8 illustrates a congestion detection logic for detecting congestion based on whether a number of consecutive negative acknowledgements received in response to access requests exceed a threshold within a time period, according to one embodiment of the invention.

FIG. 8 illustrates a congestion detection logic for detecting congestion based on whether a number of consecutive negative acknowledgements received in response to access requests exceed a threshold within a time period, according to one embodiment of the invention. In particular, FIG. 8 illustrates one embodiment of the congestion detection logic 282. The congestion detection logic 282 includes a OR logic 806, a NACK counter 812, a previous NACKs (before ACK) memory 804 and a comparison logic 814.

The ACKs signal 302 and the congestion detected signal 306 are coupled as inputs into the OR logic 806. An output of the OR logic 806 is coupled as the reset input of the NACK counter 812. The NACKs signal 304 is coupled as a data input into the NACK counter 812. An output of the NACK counter 812 is coupled as a first input of the comparison logic 814 and is coupled as an input into the previous NACKs (before ACK) memory 804. A threshold signal 802 is coupled as a second input into the comparison logic 814. The comparison logic 814 also retrieves a previous NACK value from the previous NACKs (before ACK) memory 804. The output of the comparison logic 814 is the congestion threshold signal 306.

Figure 9:
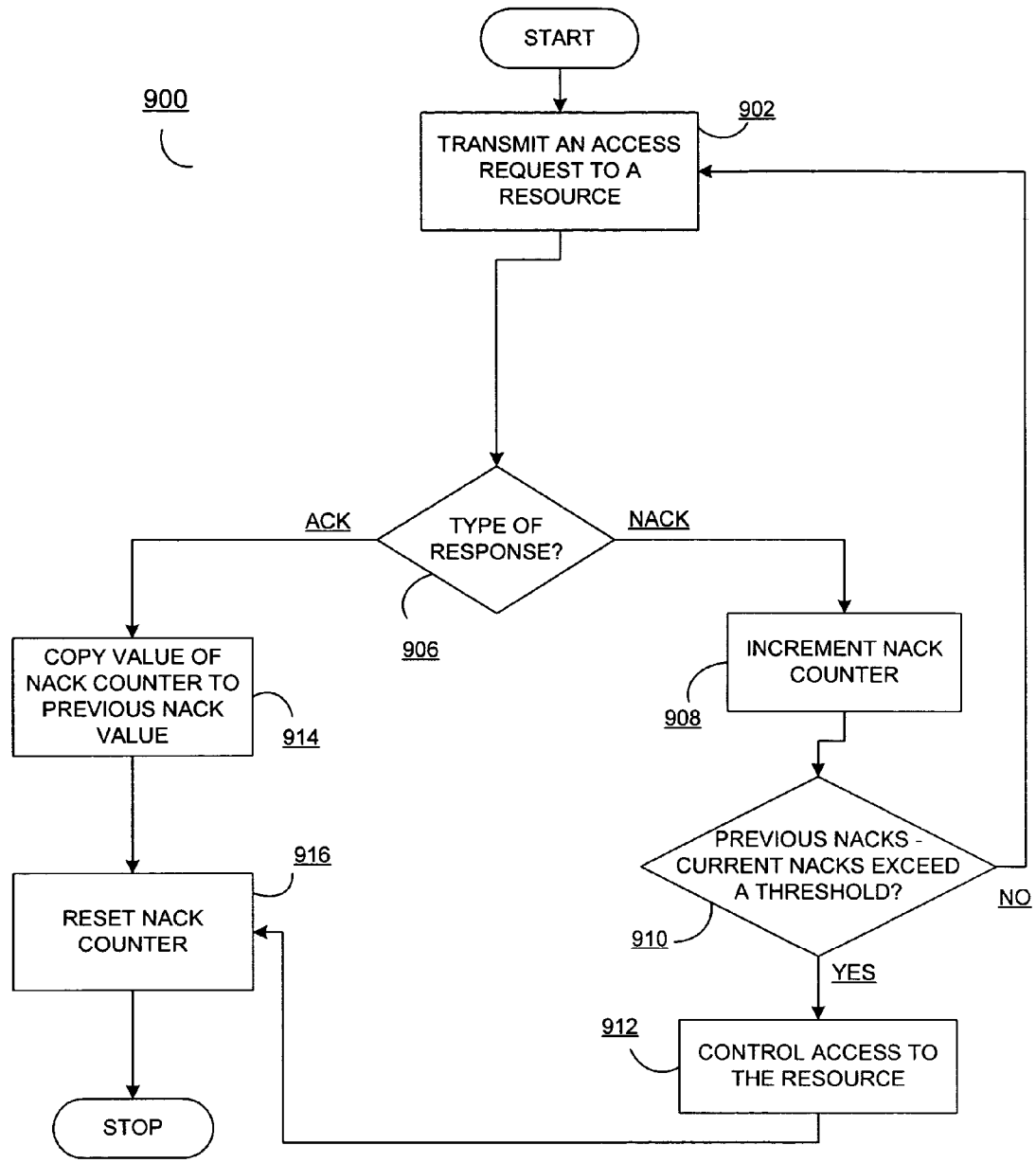
FIG. 9 illustrates a flow diagram for detecting congestion based on a number of consecutive negative acknowledgements received in response to access requests within a time period, according to one embodiment of the invention.

The operations of the congestion detection logic 282 illustrated in FIG. 8 will now be described with reference to FIG. 9. In particular, FIG. 9 illustrates a flow diagram for detecting congestion based on a number of consecutive negative acknowledgements received in response to access requests within a time period, according to one embodiment of the invention.

In block 902 of the flow diagram 900, an access request is transmitted to a resource. With reference to FIG. 3, the load/ store functional unit 218 transmits an access request to one of the cache lines within one of the cache memories 105. Control continues at block 906.

In block 906, a determination is made of the type of response received in response to the access request. With reference to the embodiment illustrated in FIG. 8, the congestion detection logic 282 and the retry logic 286 receive the response to the access request. The congestion detection logic 282 determines the type of response received in response to the access request. In particular, the congestion detection logic 282 determines whether the response is an ACK or a NACK based on whether the response is received on the ACKs signal 302 or the NACKs signal 304. Upon determining that the type of response is an ACK, control continues at block 914, which is described in more detail below.

In block 908, upon determining that the type of response is a NACK, the NACK counter is incremented. With reference to FIG. 8, the NACK counter 812 is incremented after a NACK is received on the NACKs signal 304. Control continues at block 910.

In block 910, a determination is made of whether the difference between the previous number of consecutive NACKs and the current number of consecutive NACKs exceeds a threshold. With reference to FIG. 8, the previous NACKs (before ACK) memory 804 stores the value of the number of consecutive NACKs received prior to the receipt of an ACK. Therefore, after an ACK is received, the value in the NACK counter 812 is stored in the previous NACKs (before ACK) memory 804. For example, the retry logic 286 may have retried five times before receiving an ACK from a resource. Therefore, the number of consecutive NACKs would be five, which is stored in the previous NACKs (before ACK) memory 804. The comparison logic 814 determines whether the difference between the value stored in the previous NACKs (before ACK) memory 804 and the current value of the NACK counter 812 exceeds the threshold 802. Accordingly, the comparison logic 814 compares the change of the consecutive number of NACKs between an ACK.

Referring back to FIG. 5, the embodiment of the congestion detection logic 282 shown in FIG. 6 is compared to the embodiment of the congestion detection logic 282 shown in FIG. 8. Assume that the threshold 606 for the embodiment shown in FIG. 6 is such that the congestion is not detected until the time point 514. With regard to the embodiment shown in FIG. 8, the third set of consecutive NACKs 516 (shown in FIG. 5) includes four consecutive NACKs; while a fourth set of consecutive NACKs 518 includes nine consecutive NACKs. The congestion is considered detected once the difference between the two sets of consecutive NACKs exceeds a threshold. Assuming that the threshold is two, congestion is detected at time point 512 (i.e., after six consecutive NACKS in the fourth set 518).

Accordingly in this example, the congestion is detected at an earlier point with the embodiment of FIG. 8 in comparison to when the congestion is detected with the embodiment of FIG. 6. Therefore, as described above, different embodiments of the congestion detection logic 282 using different thresholds are used based on the system configuration and the applications executing on such systems. Returning to the flow diagram 900 of FIG. 9, upon determining that the difference between the previous number of consecutive NACKs and the current number of consecutive NACKs does not exceed a threshold, control continues at block 902, where another access request is made for the resource by the retry logic 286 (in the load/store unit functional unit 218).

In block 912, upon determining that the difference between the previous number of consecutive NACKs and the current number of consecutive NACKs does exceed a threshold, access to the resource is controlled. With reference to the embodiment illustrated in FIG. 8, the comparison logic 814 generates the congestion detected signal 306. With reference to the embodiment illustrated in FIG. 3, the congestion detection logic 282 outputs an indication on the congestion detected signal 306 to the congestion control logic 284 that indicates that there is congestion with reference to access of this resource. As described in more detail below, the congestion control logic 284 precludes the retry logic 286 from retrying the accessing of the resource for a given period of time. Control continues at block 914.

In block 914, the value of the NACK counter is copied as the previous NACK value. With reference to FIG. 8, after the OR logic 806 outputs a logical high value into the reset input of the NACK counter 812, the NACK counter 812 copies its value into the previous NACKs (before ACK) memory 804. Accordingly, if an ACK is received through the ACKs signal 302 or congestion is detected (congestion detected signal 306 is a logical high value), the OR logic 806 outputs a logical high value that causes the NACK counter 812 to copy its value into the previous NACKs (before ACK) memory 804. Control continues at block 916.

In block 916, the NACK counter is reset. With reference to FIG. 8, after the OR logic 806 outputs a logical high value into the reset input of the NACK counter 812, the NACK counter 812 is reset. Accordingly, if an ACK is received through the ACKs signal 302 or congestion is detected (congestion detected signal 306 is a logical high value), the OR logic 806 outputs a logical high value that causes the NACK counter 812 to reset. The operations of the flow diagram 900 are complete.

An embodiment of the congestion detection logic 282 is now described that incorporates the number of ACKs, in addition to the number of NACKs, received in response to access requests to a resource. Accordingly, the number of NACKs may be counted without the restriction of being consecutive.

Figure 10:
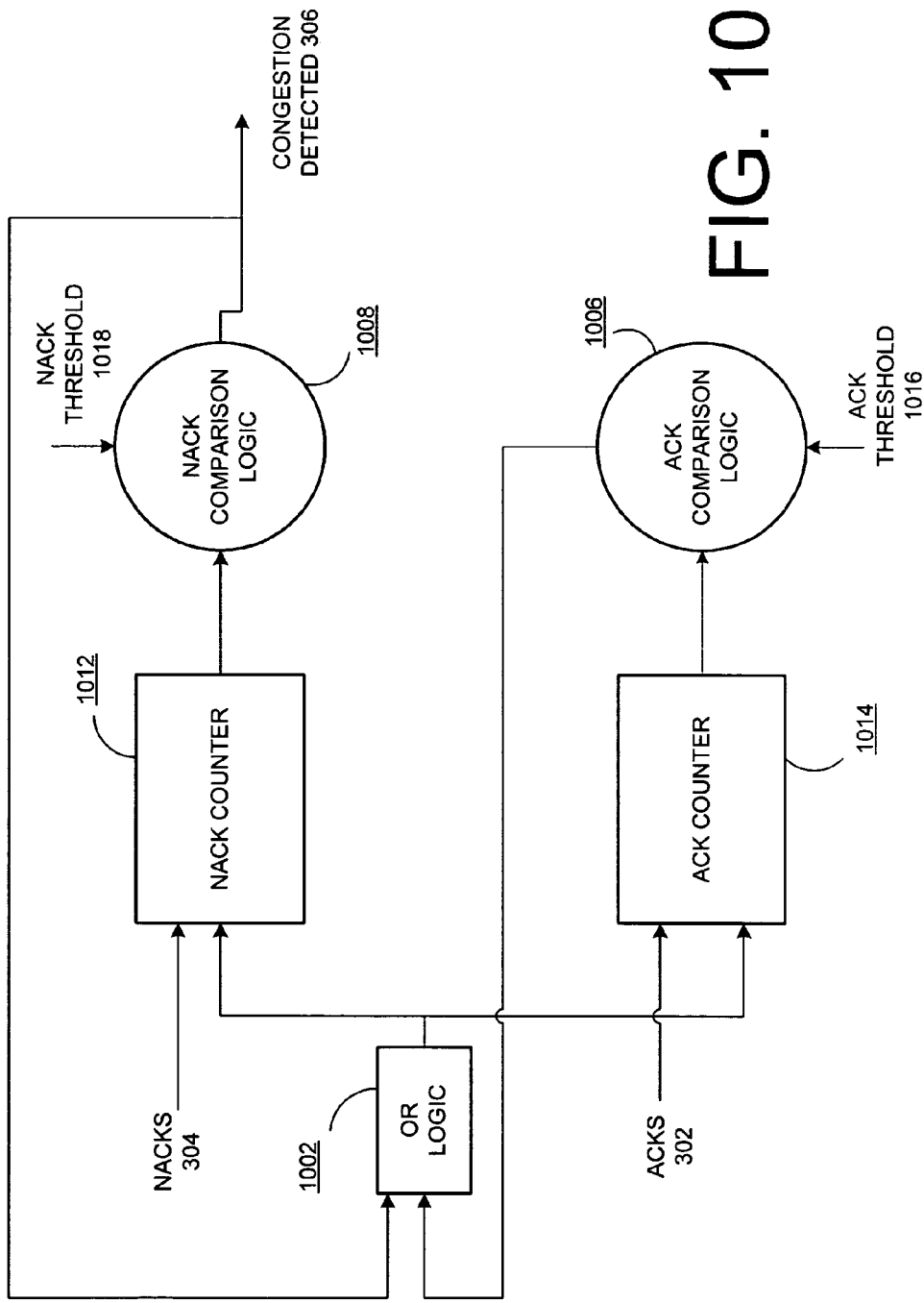
FIG. 10 illustrates a congestion detection logic for detecting congestion based on whether the ratio of the number of negative acknowledgements to the number of positive acknowledgments received in response to access requests exceeds a threshold, according to one embodiment of the invention.

In particular, FIG. 10 illustrates a congestion detection logic for detecting congestion based on whether the ratio of the number of negative acknowledgements to the number of positive acknowledgments received in response to access requests exceeds a threshold, according to one embodiment of the invention. FIG. 10 illustrates one embodiment of the congestion detection logic 282. The congestion detection logic 282 includes an OR logic 1002, a NACK counter 1012, a NACK comparison logic 1008, an ACK counter 1014 and an ACK comparison logic 1006.

The congestion detected logic signal 306 and the output from the ACK comparison logic 1006 are coupled as inputs into the OR logic 1002. The output of the OR logic 1002 is coupled to the reset input of the NACK counter 1012 and is coupled to the reset input of the ACK counter 1014. The NACKs signal 304 is coupled as a data input into the NACK counter 1012. The ACKs signal 302 is coupled as a data input into the ACK counter 1014. The output of the NACK counter 1012 is coupled as a first input into the NACK comparison logic 1008. A NACK threshold signal 1018 is coupled as a second input into the NACK comparison logic 1008. The output of the ACK counter 1014 is coupled as a first input into the ACK comparison logic 1006. An ACK threshold signal 1016 is coupled as a second input into the ACK comparison logic 1006. The output of the NACK comparison logic 1008 is the congestion threshold signal 306.

Figure 11:
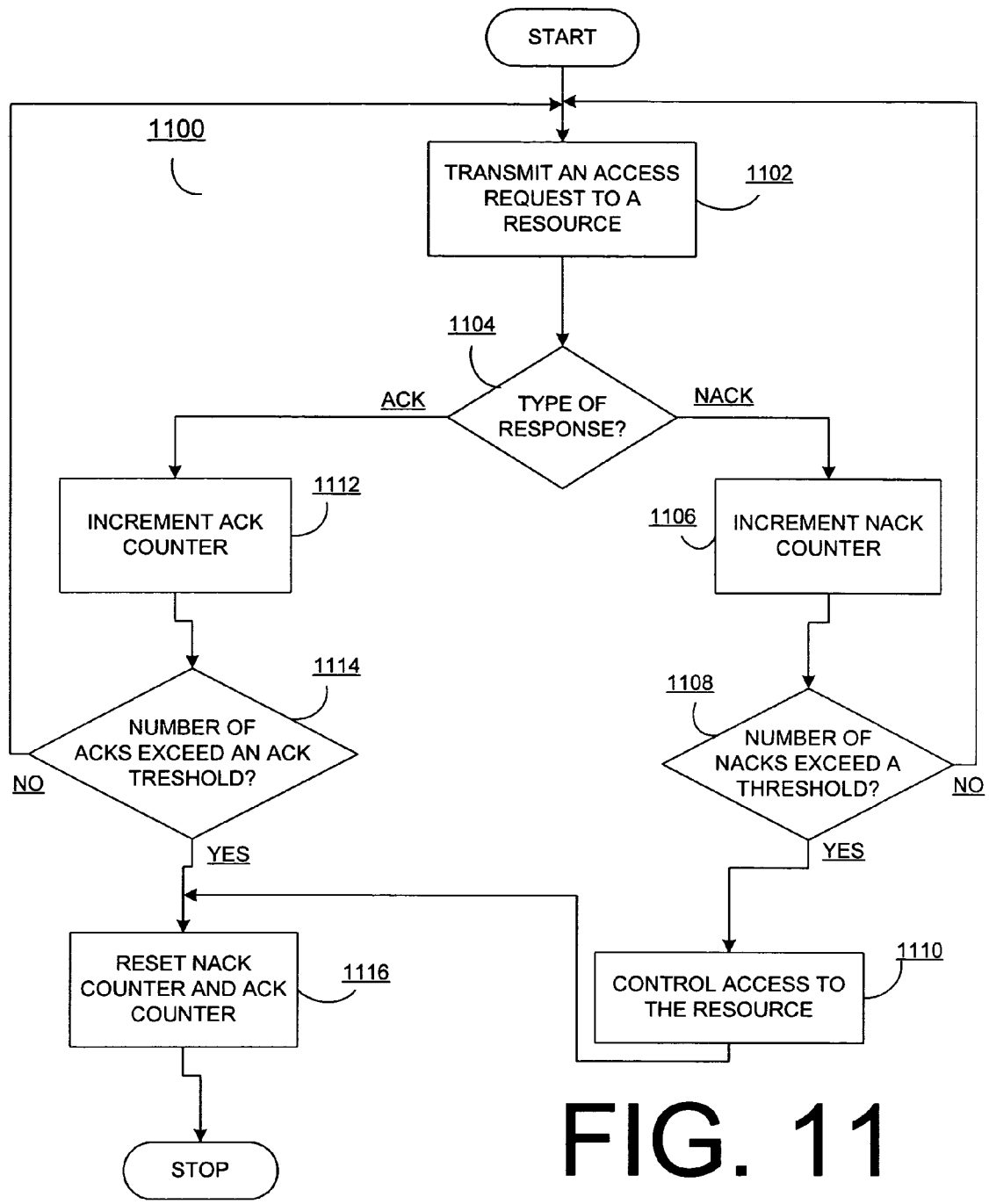
FIG. 11 illustrates a flow diagram for detecting congestion based on a ratio of the number of negative acknowledgements to the number of positive acknowledgments received in response to access requests, according to one embodiment of the invention.

The operations of the congestion detection logic 282 illustrated in FIG. 10 are now be described with reference to FIG. 11. FIG. 11 illustrates a flow diagram for detecting congestion based on a ratio of the number of negative acknowledgements to the number of positive acknowledgments received in response to access requests, according to one embodiment of the invention.

In block 1102 of the flow diagram 1100, an access request is transmitted to a resource. With reference to FIG. 3, the load/store functional unit 218 transmits an access request to one of the cache lines within one of the cache memories 105. Control continues at block 1104.

In block 1104, a determination is made of the type of response received in response to the access request. With reference to the embodiment illustrated in FIG. 3, the congestion detection logic 282 determines the type of response received in response to the access request. Upon determining that the type of response is an ACK, control continues at block 1112, which is described in more detail below.

In block 1106, upon determining that the type of response is a NACK, the NACK counter is incremented. With reference to FIG. 10, the NACK counter 1012 is incremented when a NACK is received on the NACKs signal 304. Control continues at block 1108.

In block 1108, a determination is made of whether the number of NACKs received have exceeded a threshold. With reference to the embodiment illustrated in FIG. 10, the NACK counter 1012 counts the number of NACKs received back from the resource through the NACKs signal 304. The NACK counter 1012 outputs the current value of the number of NACKs to the NACK comparison logic 1008. The NACK comparison logic 1008 compares the current value of the number of NACKs to a threshold received from the NACK threshold signal 1018. The threshold from the NACK threshold signal 1018 is a configurable value that may vary based on the configuration of the system 100. Upon determining that the number of NACKs has not exceeded the threshold, the operations of the flow diagram 1100 continue at block 1102, wherein another access request is made by the retry logic 286 (in the load/store functional unit 218).

In block 1110, upon determining that the number of NACKs has exceeded the threshold, access to the resource is controlled. With reference to the embodiment illustrated in FIG. 10, the NACK comparison logic 1008 generates the congestion detected signal 306. With reference to the embodiment illustrated in FIG. 3, the congestion detection logic 282 outputs an indication on the congestion detected signal 306 to the congestion control logic 284 that indicates that there is congestion with reference to access of this resource. As described in more detail below, the congestion control logic 284 precludes the retry logic 286 from retrying the accessing of the resource from a given period of time. Control continues at block 1116, which is described in more detail below.

In block 1112, upon determining that the type of response is an ACK, the ACK counter is incremented. With reference to FIG. 10, the ACK counter 1014 is incremented when an ACK is received on the ACKS signal 302. Control continues at block 1114.

In block 1114, a determination is made of whether the number of ACKS received has exceeded a threshold. With reference to the embodiment illustrated in FIG. 10, the ACK counter 1014 counts the number of ACKs received back from the resource through the ACKs signal 302. The ACK counter 1014 outputs the current value of the number of ACKs to the ACK comparison logic 1006. The ACK comparison logic 1006 compares the current value of the number of ACKs to a threshold received from the ACK threshold signal 1016. The threshold from the ACK threshold signal 1016 is a configurable value that may vary based on the configuration of the system 100. Upon determining that the number of ACKs has not exceeded the threshold, the operations of the flow diagram 1100 continue at block 1102, wherein another access request is made by the retry logic 286 (in the load/store functional unit 218). Upon determining that the number of ACKs has exceeded the threshold, control continues at block 1116.

In block 1116, the NACK counter and the ACK counter are reset. With reference to the embodiment illustrated in FIG. 10, the OR logic 1002 outputs a logical high to the NACK counter 1012 and the ACK counter 1014 if either congestion is detected (on the congestion detected signal 306) or if the number of ACKs received exceed a threshold. The operations of the flow diagram 1100 are complete. Therefore, the embodiment of the congestion detection logic 282 illustrated in FIG. 10 accounts for the number of ACKs in the determination of whether access to the resource is congested.

An embodiment of the congestion detection logic 282 is now described that uses the average number of NACKs in the determination of whether access to the resource is congested. Accordingly, such an embodiment does not require that the number of NACKs be consecutive in order for there to be congestion with regard to the resource being accessed.

Figure 12:
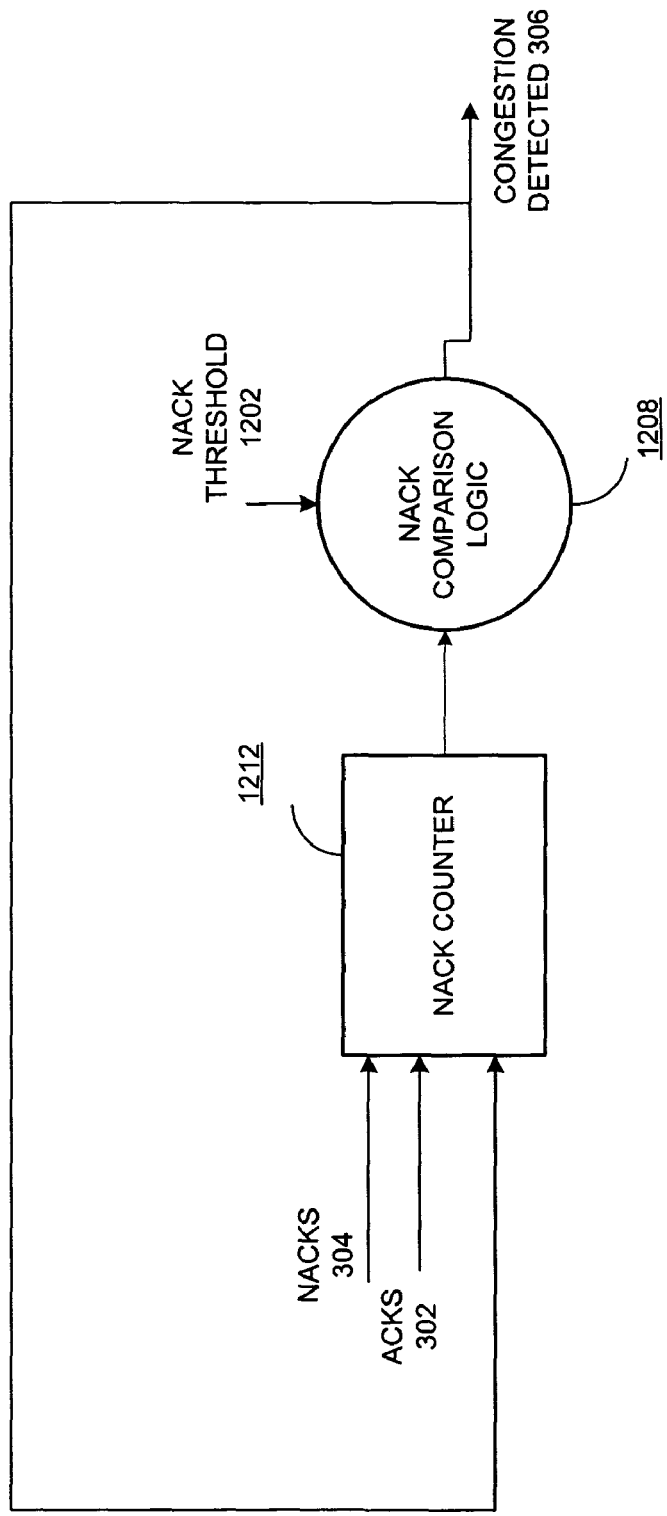
FIG. 12 illustrates a congestion detection logic for detecting congestion based on whether an average number of negative acknowledgements received in response to access requests exceeds a threshold, according to one embodiment of the invention.

In particular, FIG. 12 illustrates a congestion detection logic for detecting congestion based on whether an average number of negative acknowledgements received in response to access requests exceeds a threshold, according to one embodiment of the invention. In particular, FIG. 12 illustrates one embodiment of the congestion detection logic 282. The congestion detection logic 282 includes a NACK counter 1212 and a NACK comparison logic 1208.

The congestion detected signal 306 is coupled to the reset input of the NACK counter 1212. The NACKs signal 304 is coupled to a first data input of the NACK counter 1212. The ACKs signal 302 is coupled to a second data input of the NACK counter 1212. The output of the NACK counter 1212 is coupled to a first input of the NACK comparison logic 1208. A NACK threshold signal 1202 is coupled to a second input of the NACK comparison logic 1208. The output of the NACK comparison logic 1208 is the congestion detected signal 306.

Figure 13:
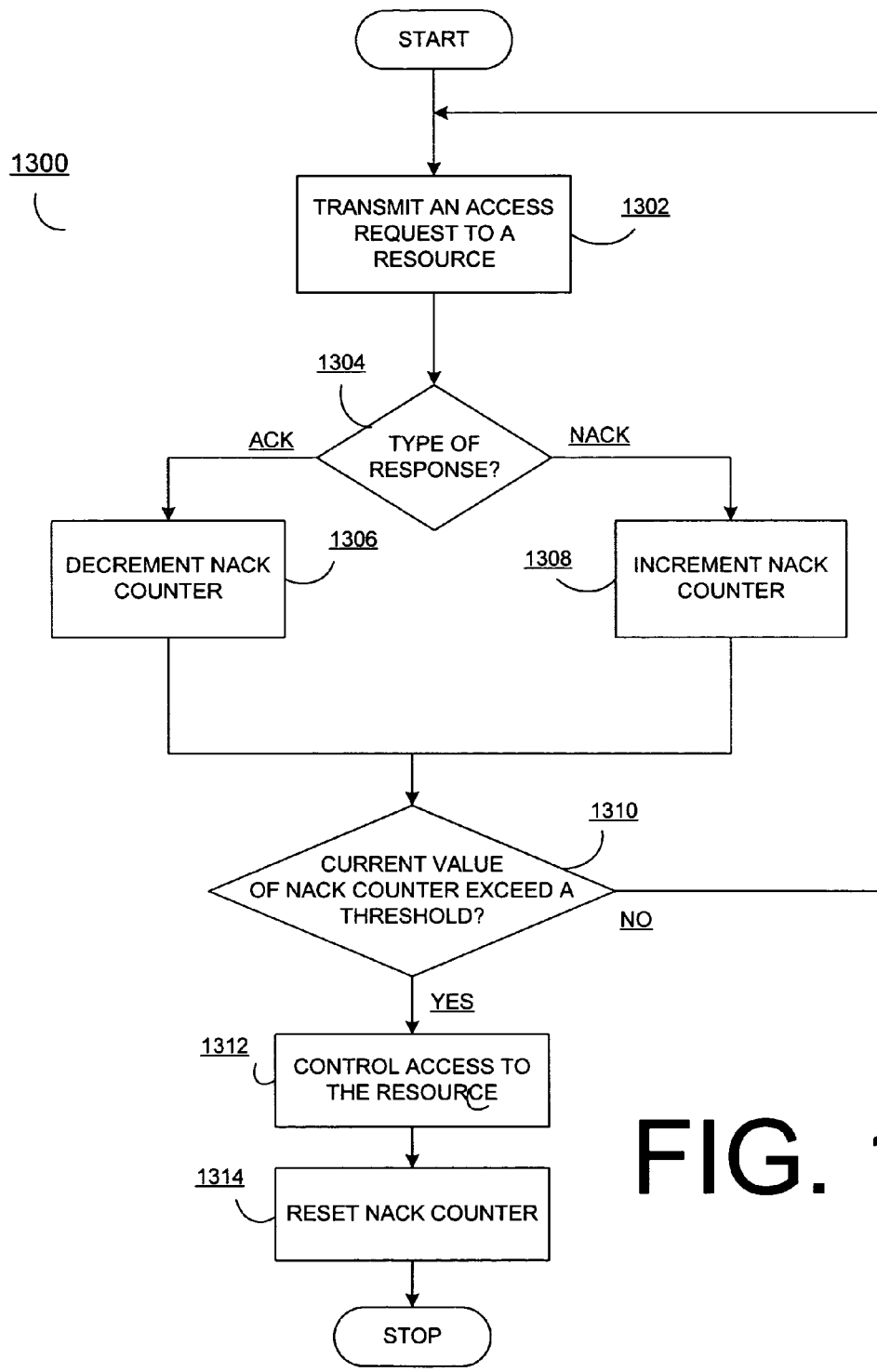
FIG. 13 illustrates a flow diagram for detecting congestion based on an average number of negative acknowledgements received in response to access requests, according to one embodiment of the invention.

The operations of the embodiment of the congestion detection logic 282 illustrated in FIG. 12 are now described in reference to the flow diagram 1300 of FIG. 13. FIG. 13 illustrates a flow diagram for detecting congestion based on an average number of negative acknowledgements received in response to access requests, according to one embodiment of the invention.

In block 1302 of the flow diagram 1300, an access request is transmitted to a resource. With reference to FIG. 3, the load/store functional unit 218 transmits an access request to one of the cache lines within one of the cache memories 105. Control continues at block 1304.

In block 1304, a determination is made of the type of response received in response to the access request. With reference to the embodiment illustrated in FIG. 3, the congestion detection logic 282 determines the type of response received in response to the access request.

In block 1306, upon determining that the type of response is an ACK, the ACK counter is decremented. With reference to FIG. 12, the ACK counter 1212 is decremented when an ACK is received on the ACKs signal 302. Control continues at block 1310, which is described in more detail below.

In block 1308, upon determining that the type of response is a NACK, the NACK counter is incremented. With reference to FIG. 12, the NACK counter 1212 is incremented when a NACK is received on the NACKs signal 304. Control continues at block 1310.

In block 1310, a determination is made of whether the current value of the NACK counter has exceeded a threshold. With reference to the embodiment illustrated in FIG. 12, the NACK counter 1212 outputs the current value of the number of NACKs to the NACK comparison logic 1208. The NACK comparison logic 1208 compares the current value of the number of NACKs to a threshold received from the NACK threshold signal 1202. Upon determining that the current value of the NACK counter has not exceeded the threshold, the operations of the flow diagram 1300 continue at block 1302, wherein another access request is made by the retry logic 286 (in the load/store functional unit 218).

In block 1312, upon determining that the current value of the NACK counter has exceeded the threshold, access to the resource is controlled. With reference to the embodiment illustrated in FIG. 12, the NACK comparison logic 1208 generates the congestion detected signal 306. With reference to the embodiment illustrated in FIG. 3, the congestion detection logic 282 outputs an indication on the congestion detected signal 306 to the congestion control logic 284 that indicates that there is congestion with reference to access of this resource. As described in more detail below, the congestion control logic 284 precludes the retry logic 286 from retrying the accessing of the resource from a given period of time. Control continues at block 1314.

In block 1314, the NACK counter is reset. With reference to the embodiment illustrated in FIG. 12, if the congested detected signal 306 indicates congestion, such indication also causes the NACK counter 1212 to reset. The operations of the flow diagram 1300 are complete.

An embodiment of the congestion detection logic 282 is now described that uses a moving (shifting) average number of NACKs in the determination of whether access to the resource is congested. Such an embodiment accounts for how the number of accesses to a resource (such as a cache memory) varies during the execution of an application by the processors 104A-104N. For example, for a typical application, initially the instructions of the application include a number of loads for loading data into the processor 104 for execution. Subsequently, the instructions of a typical application have a relatively smaller number of loads, as a number of the instructions are to operate on the data that is loaded into the processor 104. Moreover, subsequent instructions of such an application have an increased number of stores for outputting the results of the prior operations. Accordingly, the embodiment of the congestion detection logic 282 illustrated in FIG. 14 uses a window of the number of NACKs that shifts over time during the operations.

Figure 14:
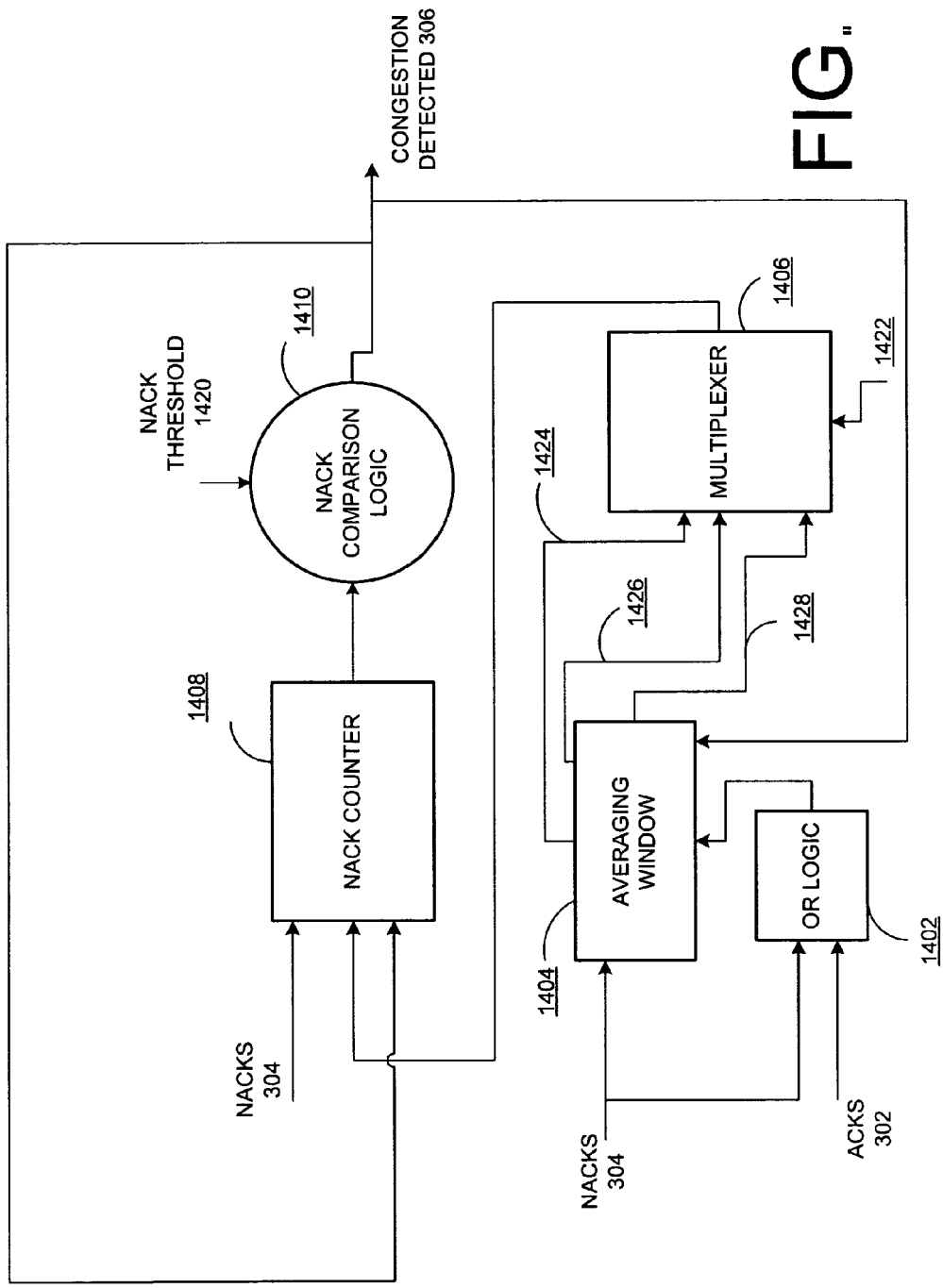
FIG. 14 illustrates a congestion detection logic for detecting congestion based on a moving average of the number of negative acknowledgements received in response to access requests, according to one embodiment of the invention.

FIG. 14 illustrates a congestion detection logic for detecting congestion based on a moving average of the number of negative acknowledgements received in response to access requests, according to one embodiment of the invention. FIG. 14 illustrates one embodiment of the congestion detection logic 282. The congestion detection logic 282 includes a NACK counter 1408, a NACK comparison logic 1410, an OR logic 1402, an averaging window shift register 1404 and a multiplexer 1406.

The NACKs signal 304 is coupled to a first input of the OR logic 1402, to a data input into the averaging window shift register 1404 and to a first data input of the NACK counter 1408. The ACKs signal 302 is coupled to a second input of the OR logic 1402. The output of the OR logic 1402 is coupled to a shift input of the averaging window shift register 1404. The congestion detected signal 306 is coupled to a reset input of the averaging window shift register 1404 and to a reset input of the NACK counter 1408. A first output 1424 of the averaging window shift register 1404 is coupled to a first input of the multiplexer 1406. A second output 1426 of the averaging window shift register 1404 is coupled to a second input of the multiplexer 1406. A third output 1428 of the averaging window shift register 1404 is coupled to a third input of the multiplexer 1406. A window slice signal 1422 is coupled to a control input of the multiplexer 1406. An output of the multiplexer 1406 is coupled to a second data input of the NACK counter 1408. The output of the NACK counter 1408 is coupled to a first input of the NACK comparison logic 1410. A NACK threshold signal 1420 is coupled as a second input of the NACK comparison logic 1410. The output of the NACK comparison logic 1410 is the congestion detected signal 306.

Figure 15:
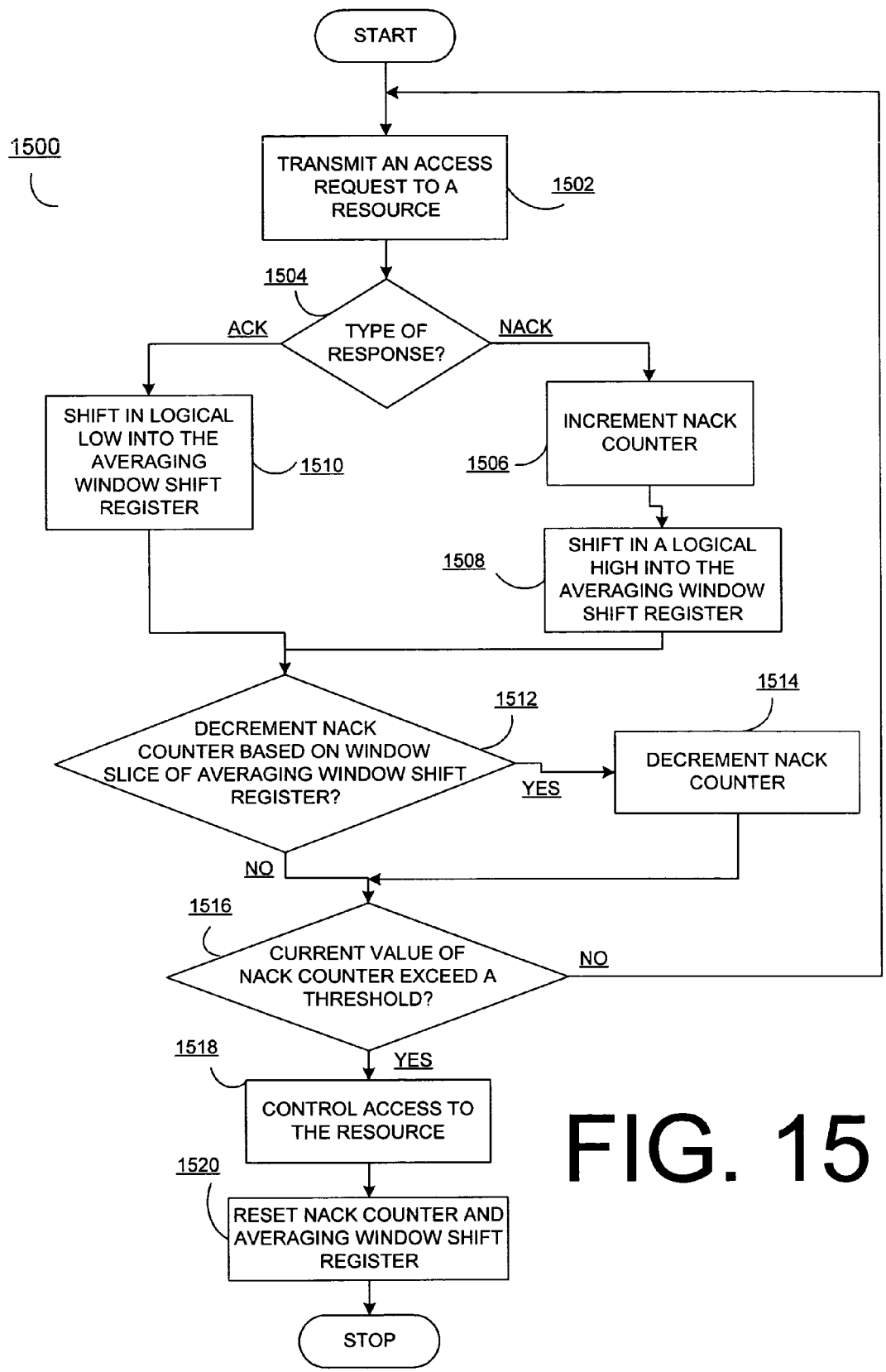
FIG. 15 illustrates a flow diagram for detecting congestion based on a moving average of the number of negative acknowledgements received in response to access requests, according to one embodiment of the invention.

The operations of the embodiment of the congestion detection logic 282 illustrated in FIG. 14 are now described in reference to the flow diagram 1500 of FIG. 15. FIG. 15 illustrates a flow diagram for detecting congestion based on a moving average of the number of negative acknowledgements received in response to access requests, according to one embodiment of the invention.

In block 1502 of the flow diagram 1500, an access request is transmitted to a resource. With reference to FIG. 3, the load/store functional unit 218 transmits an access request to one of the cache lines within one of the cache memories 105. Control continues at block 1504.

In block 1504, a determination is made of the type of response received in response to the access request. With reference to the embodiment illustrated in FIG. 3, the congestion detection logic 282 determines the type of response received in response to the access request.

In block 1506, upon determining that the type of response is an NACK, the NACK counter is incremented. With reference to FIG. 14, the NACK counter 1408 is incremented when a NACK is received on the NACK signal 304. Control continues at block 1508.

In block 1508, a logical high value is shifted into the averaging window shift register. With reference to FIG. 14, after a response (either ACK or NACK) is received, the OR logic 1404 outputs a logical high value into the shift input of the averaging window shift register 1404. In response, the averaging window shift register 1404 shifts in the current value on the NACKs signal 304. Therefore, if a response is a NACK, the averaging window shift register 1404 shifts in a logical high. If a response is an ACK, the averaging window shift register 1404 shifts in a logical low (the operation in block 1510).

Figure 16G:
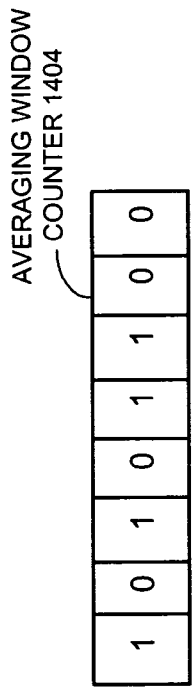
Figure 16H:
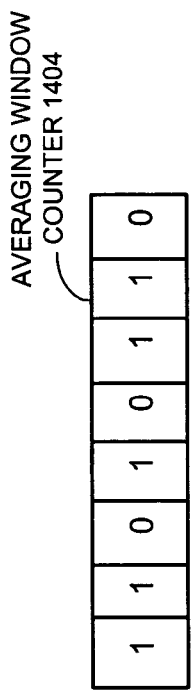
Figure 16I:
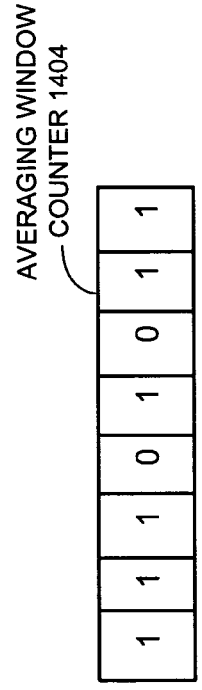

To illustrate, FIGS. 16A-16I illustrate the value an averaging window shift register (as an eight-bit shift register) over time, according to one embodiment of the invention. FIG. 16A illustrates the averaging window shift register 1404 after a reset, wherein its value is initialized to zero. FIG. 16B illustrates the averaging window shift register 1404 after a logical high is shifted therein based on a response that is a NACK. FIG. 16C illustrates the averaging window shift register 1404 after a second logical high is shifted therein based on a second response that is a NACK. FIG. 16D illustrates the averaging window shift register 1404 after a logical low is shifted therein based on a third response that is an ACK. FIG. 16E illustrates the averaging window shift register 1404 after a logical high is shifted therein based on a fourth response that is a NACK. FIG. 16F illustrates the averaging window shift register 1404 after a logical low is shifted therein based on a fifth response that is an ACK. FIG. 16G illustrates the averaging window shift register 1404 after a logical high is shifted therein based on a sixth response that is a NACK. FIG. 16H illustrates the averaging window shift register 1404 after a logical high is shifted therein based on a seventh response that is a NACK. FIG. 16I illustrates the averaging window shift register 1404 after a logical high is shifted therein based on a eighth response that is a NACK. Returning to the flow diagram 1500 of FIG. 15, control continues at block 1512, which is described in more detail below.

In block 1510, upon determining that the type of response is an ACK, a logical low value is shifted into the averaging window shift register. With reference to FIG. 14, (as described above) after a response (either ACK or NACK) is received, the OR logic 1404 outputs a logical high value into the shift input of the averaging window shift register 1404. In response, the averaging window shift register 1404 shifts in the current value on the NACKs signal 304. Therefore, if a response is an ACK, the averaging window shift register 1404 shifts in a logical low. Control continues at block 1512.

In block 1512, a determination is made of whether the NACK counter is decremented based on the window slice of the averaging window shift register. With reference to FIG. 14, the value of the window slice signal 1422 causes the multiplexer 1406 to select one of the three inputs to be inputted into the NACK counter 1408. The first output 1424, the second output 1426 and the third output 1428 are different sizes of the averaging window shift register 1404. Accordingly, the congestion detection logic 282 illustrated in FIG. 14 is configurable to vary the size of the window of the responses (ACKs and NACKs) to view in determining whether there is congestion. Therefore, the first output 1424 may be the largest size window; the second output 1426 may be the second largest window; and the third output 1428 may be the smallest size window. The first output 1424, therefore, takes into account the largest number of responses in determining whether there is congestion.

The first output 1424 selects a first bit of the averaging window shift register 1404. The second output 1426 selects a second bit of the averaging window shift register 1404. The third output 1428 selects a third bit of the averaging window shift register 1404. Returning to FIG. 16I, for example, third output 1428 selects the rightmost bit (bit zero having a value of one). The second output 1426 selects the second to the rightmost bit (bit one having a value of one). The first output 1424 selects the third to the rightmost bit (bit two having a value of zero). Accordingly, the values shifted into the averaging window shift register 1404 moves the window, while the different bit selections of the averaging window shift register 1404 determines the size of the window of responses used to determine whether there is congestion.

The value of the window slice signal 1422 causes the multiplexer 1406 to select one of the three bits that are outputted from the averaging window shift register 1404. The output from the multiplexer 1406 is inputted into a data input the NACK counter 1408. The NACK counter 1408 decrements its current value of the number of NACKs, if the multiplexer 1406 outputs a bit having a value of one. The NACK counter 1408 does not decrement its current value of the number of NACKs, if the multiplexer 1406 outputs a bit having a value of zero. Upon determining that the NACK counter is not decremented, control continues at block 1516, which is described in more detail below.

In block 1514, upon determining that the NACK counter is decremented, the NACK counter is decremented. With reference to FIG. 14, the NACK counter 1408 is decremented after the multiplexer 1406 selects a value of one from the averaging window shift register 1404. Control continues at block 1516.

In block 1516, a determination is made of whether the current value of the NACK counter has exceeded a threshold. With reference to the embodiment illustrated in FIG. 14, the NACK counter 1408 outputs the current value of the number of NACKs to the NACK comparison logic 1410. The NACK comparison logic 1410 compares the current value of the number of NACKs to a threshold received from the NACK threshold signal 1420. Upon determining that the current value of the NACK counter 1408 has not exceeded the threshold, the operations of the flow diagram 1500 continue at block 1502, wherein another access request is made by the retry logic 286 (in the load/store functional unit 218).

In block 1518, upon determining that the current value of the NACK counter has exceeded the threshold, access to the resource is controlled. With reference to the embodiment illustrated in FIG. 14, the NACK comparison logic 1410 generates the congestion detected signal 306. With reference to the embodiment illustrated in FIG. 3, the congestion detection logic 282 outputs an indication on the congestion detected signal 306 to the congestion control logic 284 that indicates that there is congestion with reference to access of this resource. As described in more detail below, the congestion control logic 284 precludes the retry logic 286 from retrying the accessing of the resource from a given period of time. Control continues at block 1520.

In block 1520, the NACK counter and the averaging window shift register are reset. With reference to the embodiment illustrated in FIG. 14, if the congested detected signal 306 indicates congestion (e.g., a logical high), such indication also causes the NACK counter 1408 and the averaging window shift register 1404 to reset. The operations of the flow diagram 1500 are complete.

Congestion Control Description

After the congestion has been detected, access of the resource is controlled. While a number of different operations may be used to control the access, in one embodiment, the congestion control logic 284 delays the issuance of retry requests by the retry logic 286. However, the length of delay may affect the performance of the system 100. Therefore, a number of considerations may be taken into account when determining the length of the delay. The detection may be a false indication of congestion depending on the system configuration, the application being executed and/or the types of congestion detection logic used. If there is actual congestion but if the delay is too small, the number of retries for accessing the resource may be too great. Also, if the detection is false but if the delay is too large, the performance of the system 100 may be adversely affected. Moreover, if the congestion storm is detected at a late stage of congestion and the confidence of detection is high, the delay may be too large. However, if the congestion storm is detected at an earlier stage, but the detection is not definitive, the delay may be too small.

Additionally, collision control logic may be incorporated into embodiments of the invention that controls the retry of the access requests across the different processors. In one embodiment, the collision control logic may include some random delay such that all of the processors do not retry the accessing of a resource at the same time. Returning to FIG. 4, assume that the congestion control logic 284 is not provided an indication of when the falling edge 412 is reached with regard to congestion. Accordingly, if the congestion is in the range of the falling edge 412, performance may be adversely affected if the congestion control logic 284 does not retry at certain points of the congestion. In particular, the resource may no longer be congested and could be accessed but the congestion control logic 282 continues to preclude the retrying of accessing the resource. However, the retry logic 286 may be required to retry extra times to determine the degree of congestion.

One embodiment for responding to memory congestion/contention in a multi-processor system is now described. In particular, one embodiment of congestion control logic 284 based on an exponential back off delay operation is now described. In such an embodiment, the amount of delay increases each time extra congestion is detected. Further, the amount of delay decreases each time the processor 104 receives a given number of ACKs for the resource.

Figure 17:
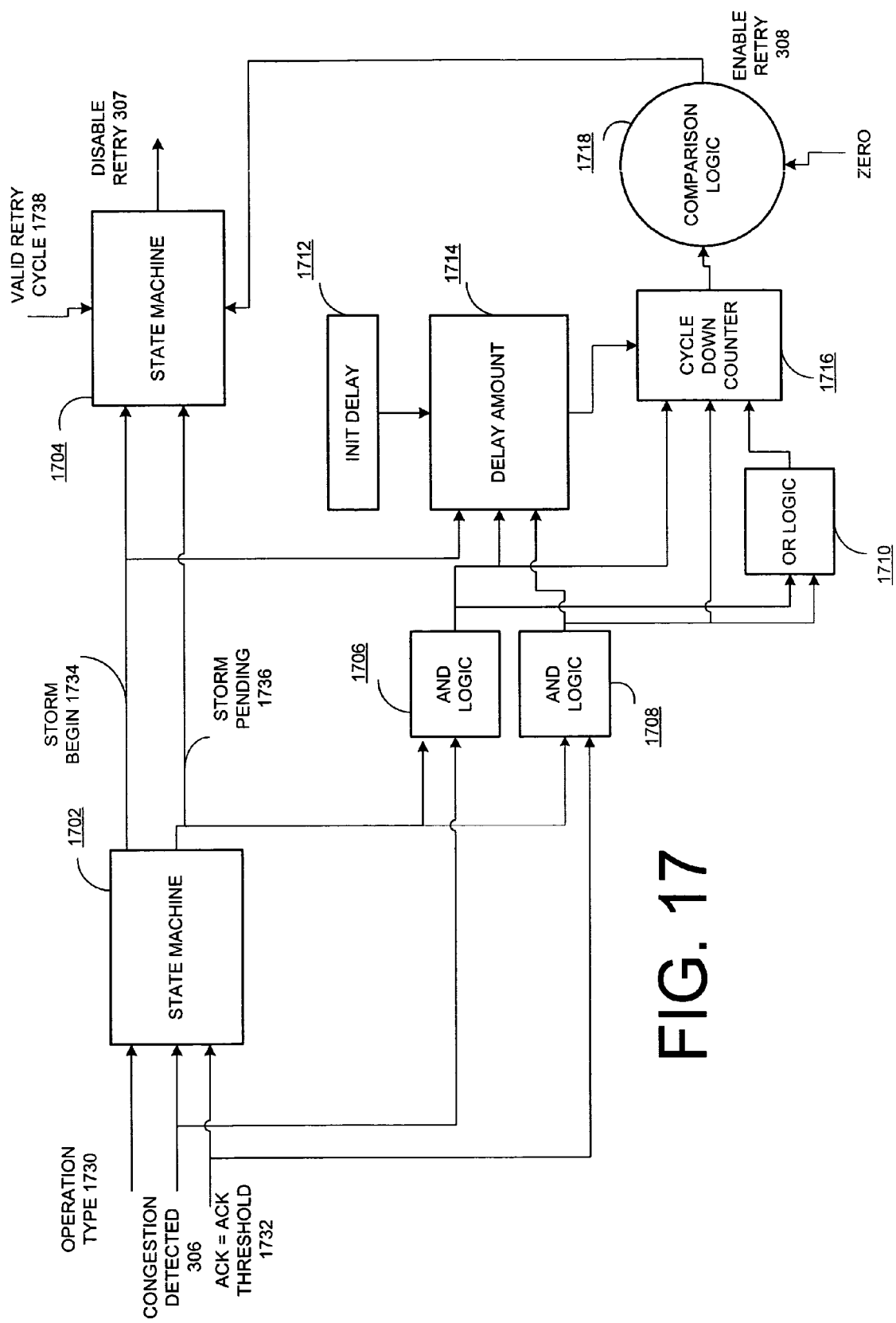
FIG. 17 illustrates a congestion control logic for controlling access to a resource based on an exponential back off delay operation, according to one embodiment of the invention.

In particular, FIG. 17 illustrates a congestion control logic for controlling access to a resource based on an exponential back off delay operation, according to one embodiment of the invention. FIG. 17 illustrates one embodiment of the congestion control logic 284. The congestion control logic 284 includes a state machine 1702, a state machine 1704, an AND logic 1706, an AND logic 1708, an OR logic 1710, an initial delay memory 1712, a delay amount 1714, a cycle down counter 1716 and a comparison logic 1718.

An operation type signal 1730 is coupled to a first input of the state machine 1702. The operation type signal 1730 indicates the type of congestion detection operation used (e.g., consecutive number of NACKs, moving average of the number of NACKs, etc.). In particular, the one to a number of different types of congestion detection logic 282 may be coupled to the congestion control logic 284. Additionally, one to a number of the congestion detection logic 282 may be used to indicate detection. The operation type signal 1730 indicates which congestion detection operation is indicating congestion on the congestion detected signal 306 being received. Therefore, if two different congestion detection logics 282 are coupled to the congestion control logic 284, the state machine 1702 may select whether to control congestion based on which congestion detection logic 282 generated the congestion detected signal 306.

The congestion detected signal 306 is coupled to a second input of the state machine 1702 and to a first input of the AND logic 1706. The ACKs=ACK threshold signal 1732 is coupled to a third input of the state machine 1702 and to a first input of the AND logic 1708. The state machine 1702 outputs a storm begin signal 1734 and a storm pending signal 1736. The storm begin signal 1734 is coupled to a first input of the state machine 1704 and to a power load input of the delay amount 1714. The storm pending signal 1736 is coupled to a second input of the state machine 1704, to a second input of the AND logic 1706 and to a second input of the AND logic 1708.

The output of the AND logic 1706 is coupled to a left shift input of the delay amount 1714, to a left shift input of the cycle down counter 1716 and to a first input of the OR logic 1710. The output of the AND logic 1708 is coupled to a right shift input of the delay amount 1714, to a right shift input of the cycle down counter 1716 and to a second input of the OR logic 1710. The initial delay memory 1712 is coupled to be inputted into the delay amount 1714. The output of the delay amount 1714 is coupled to an input of the cycle down counter 1716. The output of the OR logic 1710 is coupled to a start input of the cycle down counter 1716. The output of the cycle down counter is coupled to a first input of the comparison logic 1718. The comparison logic 1718 is coupled to receive a zero input value. The output of the comparison logic 1718 is an enable retry signal 308 that is coupled to an input of the state machine 1704.

A valid retry cycle signal 1738 is coupled to an input of the state machine 1704. The output of the state machine 1704 is a disable retry signal 307. The valid retry cycle signal 1738 is an indicator of when a retry of a request made be made. For example, in one embodiment, the processor 104 may be configured to retry a request once every eight clock cycles. Therefore, after the enable retry signal 308 indicates that a request may be retried, the state machine 1704 does not provide this indication on the disable retry signal 307 to the retry logic 286 until the valid retry cycle signal 1738 indicates that a retry may be made. The operations of the congestion control logic 284 shown in FIG. 17 are now described with reference to flow diagrams 1800, 1830 and 1850 of FIGS. 18A, 18B and 18C, respectively.

Figure 18A:
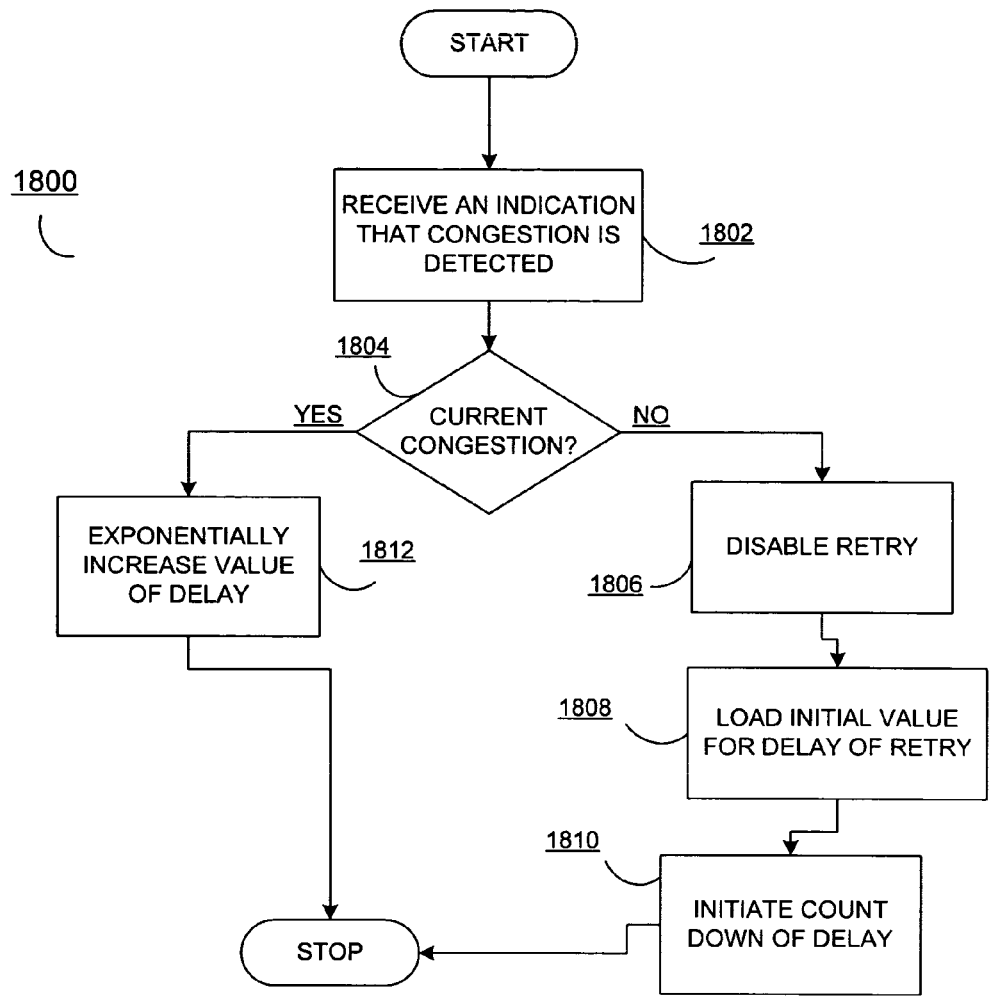
FIGS. 18A-18C illustrate flow diagrams for controlling congestion of accesses to a resource based on an exponential back off delay, according to one embodiment of the invention.
Figure 18B:
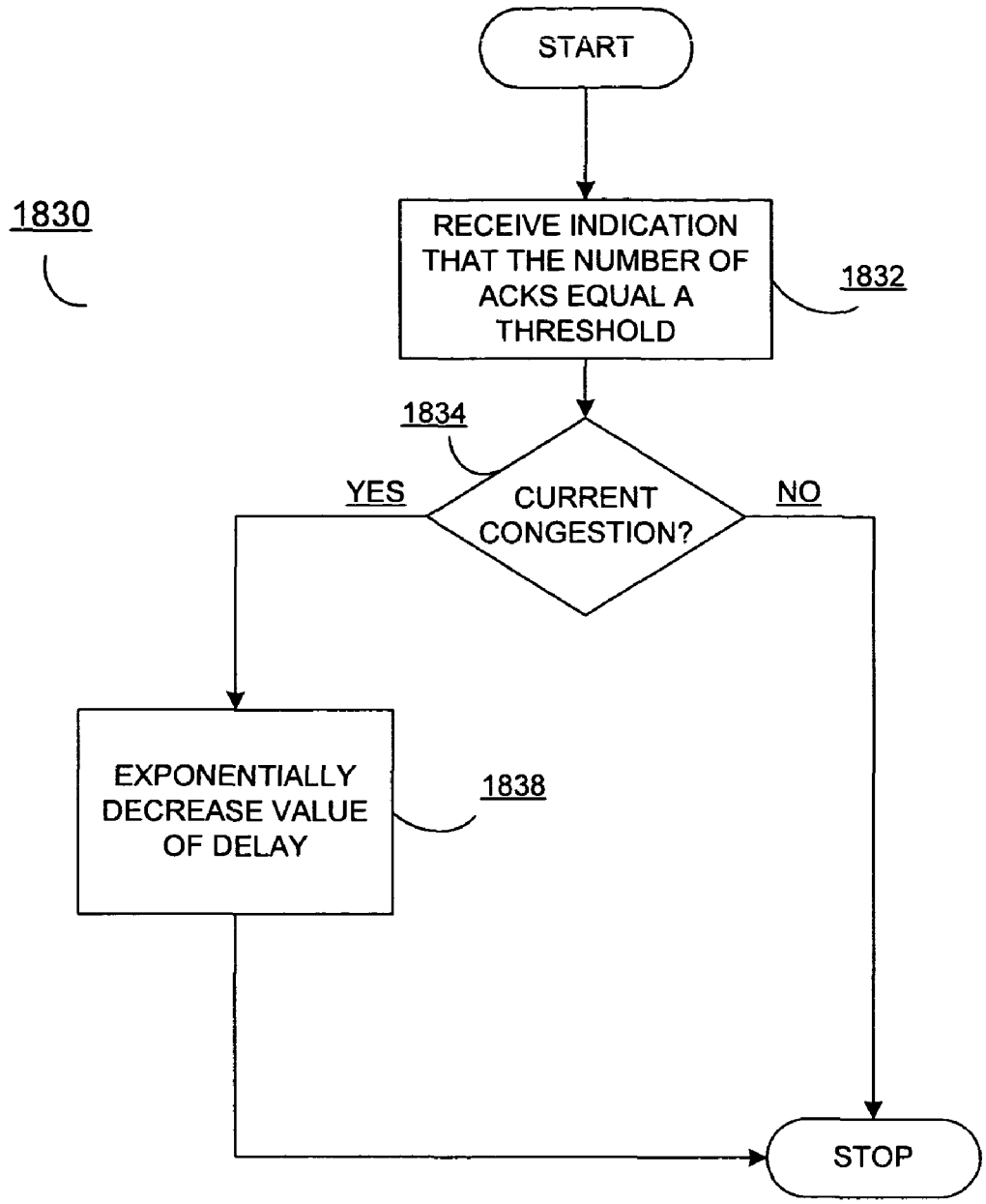
Figure 18C:
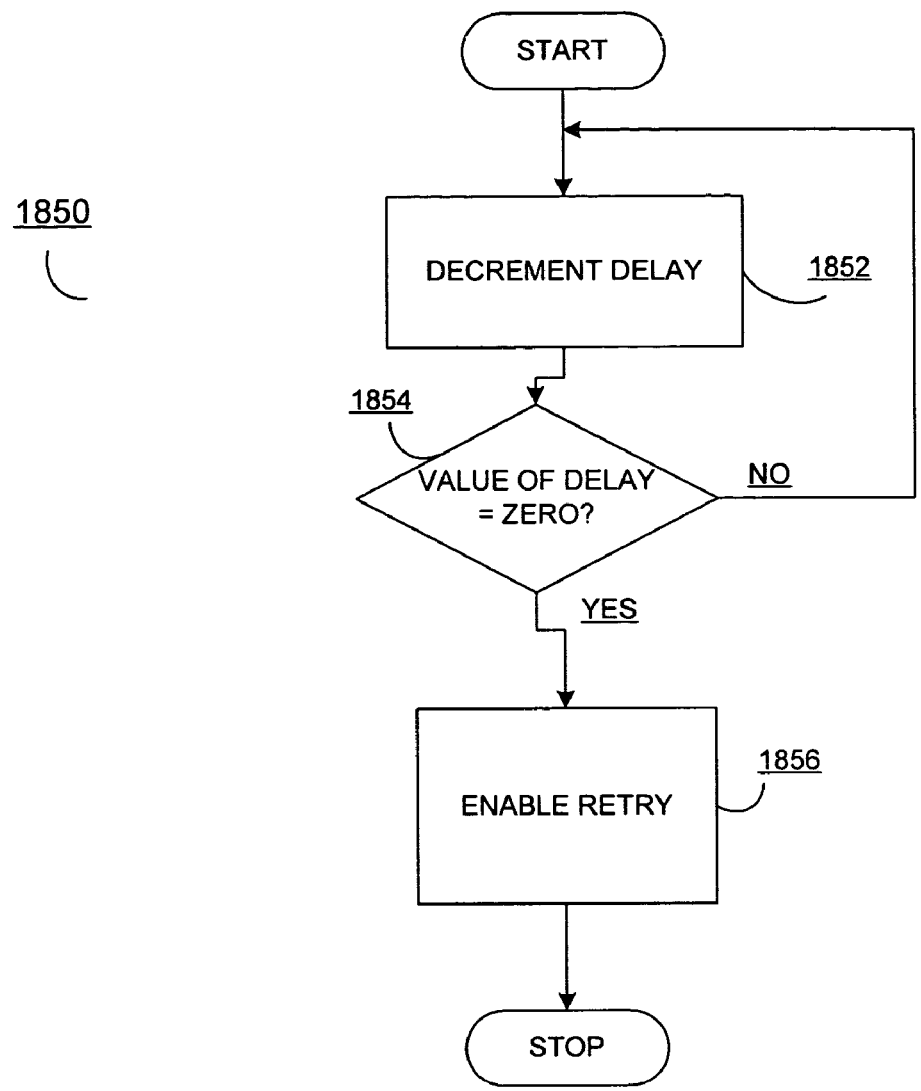

FIGS. 18A-18C illustrate flow diagrams for controlling congestion of accesses to a resource based on an exponential back off delay, according to one embodiment of the invention. FIGS. 18A-18C illustrate different independent operations for controlling congestion of accesses to a resource. FIG. 18A illustrates the flow diagram 1800 for the operations of the congestion control logic 284 illustrated in FIG. 17 upon receipt of an indication that congestion is detected. FIG. 18B illustrates the flow diagram 1830 for the operations of the congestion control logic 284 illustrated in FIG. 17 after the number of ACKS equal a threshold. FIG. 18C illustrates the flow diagram 1850 for the operations of the congestion control logic 284 illustrated in FIG. 17 after congestion is detected. The operations of the flow diagram 1800 are now described.

In block 1802, an indication that congestion is detected is received. With reference to FIG. 17, the state machine 1702 receives such an indication on the congestion detected signal 306 (being received from the congestion detection logic 282). The state machine 1702 varies the processing of this indication based on the current state of the congestion control logic 284. Control continues at block 1804.

In block 1804, a determination is made of whether there is congestion currently. With reference to FIG. 17, the state machine 1702 determines whether there is congestion currently. In particular, the state machine 1702 stores the current state of the congestion control logic 284 (including whether there is congestion currently). In particular, a determination is made of whether other cache lines in the memory are congested.

In block 1806, upon determining that there is not congestion currently, the retry is disabled. With reference to FIG. 17, the state machine 1702 sets the storm begin signal 1734 and the storm pending signal 1736 (indicative of a congestion storm) to logical high values. The state machine 1704 receives these logical high values on the storm begin signal 1734 and the storm pending signal 1736. The logical high value for the storm begin signal 1734 causes the state machine 1704 to output a logical high value on the disable retry signal 307, thereby indicating that retries are to be disabled. Returning to FIG. 3, this value on the disable retry signal 307 causes the retry logic 286 to stop retrying of accessing the resource. Control continues at block 1808.

In block 1808, the initial value of delay of the retry is loaded. With reference to FIG. 17, the delay amount 1714 receives the logical high value on the storm beginning signal 1734 on its power load input. In turn, the delay amount 1714 loads an initial delay value from initial delay memory 1712. This value (which may be configurable) is the initial amount of delay before retries of access to the resource may resume. Control continues at block 1810.

In block 1810, the count down of the delay is initiated. With reference to FIG. 17 (as described in block 1810 above), the AND logic 1706 outputs a logical high value after receipt of a logical high value from the storm pending signal 1736 and a logical high value from the congestion detected signal 306. The output of the AND logic 1706 is inputted into an input of the OR logic 1710. The output of the OR logic 1710 is inputted into the start input of the cycle down counter 1716. Therefore, the cycle down counter 1716 starts the count down of the delay when there is congestion currently and additional congestion is received. A more detailed description of this count down operation is described in more detail below in conjunction with the flow diagram 1850 of FIG. 18C.

In block 1812, upon determining that there is congestion currently, the value of the delay is increased exponentially. With reference to FIG. 17, if there is congestion currently, the storm pending signal 1736 has a logical high value. The AND logic 1706 receives this logical high value and the logical high value from the congestion detected signal 306, thereby causing the AND logic 1706 to output a logical high that is inputted into the left shift input of the delay amount 1714 and the left shift input of the cycle down counter 1716. In an embodiment, the delay amount 1714 and the cycle down counter 1716 left shift zeros into the least significant bit of current value of the delay. Accordingly, the amount of delay is exponentially increased each time there is congestion currently and additional congestion is detected.

The operations of the congestion control logic 284 after the number of ACKS equal a threshold are now described in reference to the flow diagram 1830 of FIG. 18B.

In block 1830, an indication is received on the signal 1732 that the number of ACKs received equals an ACK threshold. With reference to FIG. 17, the state machine 1702 and the AND logic 1732 receives this indication on the signal 1732. Such a signal indicates when the number of ACKs returned in response to accessing a resource exceeds a given threshold. Control continues at block 1834.

In block 1834, a determination is made of whether there is congestion currently. With reference to FIG. 17 (as described above), the state machine 1702 determines whether there is congestion currently. In particular, the state machine 1702 stores the current state of the congestion control logic 284 (including whether there is congestion currently). Upon determining there is no congestion currently, the operations of the flow diagram 1830 are complete.

In block 1838, upon determining that there is congestion currently, the value of the delay (for retry) is exponentially decreased. With reference to FIG. 17, if there is congestion currently, the storm pending signal 1736 has a logical high value. The AND logic 1708 receives this logical high value and the logical high value from the signal 1732 (that indicates that the number of ACKs received exceed a threshold), thereby causing the AND logic 1708 to output a logical high that is inputted into the right shift input of the delay amount 1714 and the right shift input of the cycle down counter 1716. In an embodiment, the delay amount 1714 and the cycle down counter 1716 right shift zeros into the least significant bit of current value of the delay. Accordingly, the amount of delay is exponentially decreased each time there is congestion currently and the number of ACKs exceed a threshold. Control continues at block 1840.

A more detailed description of this count down operation is now described in more detail below in conjunction with the flow diagram 1850 of FIG. 18C.

In block 1852, the value of the delay is decremented. With reference to FIG. 17, after the cycle down counter is initiated (as described above in FIGS. 18A and 18B), the cycle down counter 1716 decrements the current value stored therein. Control continues at block 1854.

In block 1854, a determination is made of whether the value of the delay equals zero. With reference to FIG. 17, the comparison logic 1718 retrieves the current value of the delay stored in the cycle down counter 1716. The comparison logic 1718 compares this value to zero. In one embodiment, the cycle down counter 1716 is partitioned into a lower set of bits and an upper set of bits to allow for random delay. In such an embodiment, the lower set of bits start from a maximum value and count down to zero and restarts at the maximum value. For example, if the lower set of bits are the lower four bits, the maximum value is 1111 and counts down to 0000. Once the lower four bits are restarted at the maximum value, a carry value is carried over to the upper set of bits. The upper set of bits are loaded with a configurable value from one of the special purpose registers. The upper set of bits counts down from the loaded configurable value to zero and restarts at the loaded configurable value. Accordingly, the comparison logic 1718 determines whether the value of the cycle down counter 1716 (including the lower set of bits and the upper set of bits) equals zero. Upon determining that the current value of the delay is not equal to zero, control continues at block 1852, wherein the delay is again decremented.

In block 1856, upon determining that the current value of the delay is equal to zero, the retry is enabled. With reference to FIG. 17, the comparison logic 1718 outputs an indication on the enable retry signal 308 that indicates that access to the resource may be retried. The state machine 1704 receives this indication and outputs an indication on the disable retry signal 307 that is inputted into the retry logic 286, thereby enabling the retry logic 286 to output access requests to the resource.

Thus, methods, apparatuses and systems for detection and control of resource congestion by a number of processors have been described. Although the invention has been described with reference to specific exemplary embodiments, it will be evident that various modifications and changes may be made to these embodiments without departing from the broader spirit and scope of the invention. For example, while described with regard to congestion for access to a cache line in a cache memory, embodiments of the invention are not so limited, as detection and control of congestion may be in regard to other resources, such as secondary storage disks, a network connection, printer, etc. Moreover, in an embodiment, the multiple processors in the system may be configured depending on the system configuration and the application therein. For example, the types of memory detection and congestion to execute in the processors may vary depending on the number of processors in the system as well as the number of accesses by the application that is executing therein. Therefore, the specification and drawings are to be regarded in an illustrative rather than a restrictive sense.

What is claimed is:

1. An apparatus comprising:
  a load/store unit that includes a retry logic that is to retry access to a memory resource operatively coupled to the apparatus after receipt from the memory resource of a negative acknowledgment for an attempt to access the memory resource by the load/store unit; and
  a congestion detection logic to output a signal that indicates that the memory resource is congested based on receipt from the memory resource of a consecutive number of negative acknowledgments in response to access requests to the memory resource.

2. The apparatus of claim 1 further comprising a congestion control logic to disable the retry logic from retry accesses to the memory resource based on receipt of the signal from the congestion detection logic.

3. The apparatus of claim 2, wherein the congestion control logic is to exponentially increase the delay after the congestion detection logic is to detect congestion while the memory resource is currently congested.

4. The apparatus of claim 2, wherein the congestion control logic is to exponentially decrease the delay after the congestion detection logic receive a number of positive acknowledgments in response to access requests to the memory resource.

5. A processor comprising:
a functional unit to attempt to access data from memory coupled to the processor based on an access request, wherein the functional unit is to retry attempts to access of the data based on other access requests after receipt from the memory of a negative acknowledgment in response to the attempt to access the data; and
a congestion detection logic to detect congestion of access of the data from the memory based on receipt from the memory of a consecutive number of negative acknowledgments that exceed a threshold prior to access of the data; and
a congestion control logic to disable the functional unit from the attempts to access the data from the memory for a time period after congestion is detected.

6. The processor of claim 5, wherein the congestion control logic is to exponentially increase the time period after the congestion detection logic is to detect congestion while access to other data in the memory is congested.

7. The processor of claim 6, wherein the congestion control logic is to exponentially decrease the time period after the congestion detection logic receives a number of positive acknowledgments in response to attempts to access data in the memory.

8. A processor comprising:
a functional unit to attempt to access a cache line in a cache memory coupled to the processor based on an access request, wherein the functional unit is to retry attempts to access the cache line based on additional access requests after receipt from the cache memory of a negative acknowledgment in response to the attempt to access the data;
a congestion detection logic to detect congestion of access of the cache line in the cache memory based on an average number of negative acknowledgments received from the cache memory that exceed a threshold prior to access of the data; and
a congestion control logic to disable the functional unit from attempts to access the cache line in the cache memory for a time period after congestion is detected.

9. The processor of claim 8, wherein the average number of negative acknowledgments is within a window and wherein the congestion detection logic is to move the window over time of attempts to access the cache line by the functional unit.

10. The processor of claim 8, wherein the congestion control logic is to exponentially increase the time period after the congestion detection logic is to detect congestion while access of other cache lines in the cache memory is congested.

11. The processor of claim 8, wherein the congestion control logic is to exponentially decrease the time period after the congestion detection logic receives a number of positive acknowledgments in response to attempts to access other cache lines in the cache memory.

12. A system comprising:
a cache memory to store data; and
a first processor to attempt to access data from the cache memory based on access requests, wherein the first processor includes a congestion detection logic to detect congestion of access to the data from the cache memory based on receipt from the cache memory of a consecutive number of negative acknowledgments in response to the access requests.

13. The system of claim 12 further comprising:
a second processor associated with the cache memory;
a hub controller to receive the access requests from the first processor, the hub controller to forward the access requests to the second processor, wherein the second processor is to determine whether the data in the cache memory is accessible.

14. The system of claim 13, wherein the second processor is to transmit a negative acknowledgment back to the first processor through the hub controller if the data is not accessible, the second processor to transmit a positive acknowledgment back to the first processor through the hub controller if the data is accessible.

15. The system of claim 12, wherein the first processor further comprises a congestion control logic to disable the first processor from transmitting the access requests if the congestion detection logic determines that access to the data is congested.

16. The system of claim 12, wherein the congestion control logic is to disable the first processor from transmitting the access requests for a time period, wherein the time period is based on an exponential back off delay operation.

17. A system comprising:
a memory resource; and
a first processor having a load/store functional unit, the load/store functional unit to attempt to access the memory resource based on access requests, wherein the first processor includes a congestion detection logic to detect congestion of access of the memory resource based on a consecutive number of negative acknowledgments received from the memory resource in response to the access requests prior to receipt received from the memory resource of a positive acknowledgment in response to one of the access requests within a first time period.

18. The system of claim 17 further comprising:
a second processor associated with the memory resource;
a hub controller to receive the access requests from the first processor, the hub controller to forward the access requests to the second processor, wherein the second processor is to determine whether the memory resource is accessible.

19. The system of claim 18, wherein the second processor is to transmit a negative acknowledgment back to the first processor through the hub controller if the memory resource is not accessible, the second processor to transmit a positive acknowledgment back to the first processor through the hub controller if the memory resource is accessible.

20. The system of claim 17, wherein the first processor further comprises a congestion control logic to disable the load/store functional unit from attempting to access the memory resource if the congestion detection logic is to detect congestion of access of the memory resource.

21. The system of claim 17, wherein the congestion control logic is to disable the load/store unit from attempts to access the memory resource for a second time period, wherein the second time period is based on an exponential back off delay operation.

22. A system comprising:
a cache memory to include a number of cache lines for storage of data; and
at least two processors, wherein a first processor of the at least two processors is to attempt to access the data in one of the number of cache lines in the cache memory based on access requests, wherein the first processor includes a congestion detection logic to detect congestion of access of a first cache line of the number of cache lines in the cache memory based on a ratio of a number of negative acknowledgments to a number of positive acknowledgments received from the cache memory in response to the access requests.

23. The system of claim 22, wherein a second processor of the at least two processors is associated with the cache memory and wherein the system further comprises a hub controller, the hub controller to receive the access requests from the first processor, the hub controller to forward the access requests to the second processor, wherein the second processor is to determine whether the one of the number of cache lines is accessible.

24. The system of claim 23, wherein the second processor is to transmit a negative acknowledgment back to the first processor through the hub controller if the one of the number of cache lines is not accessible, the second processor to transmit a positive acknowledgment back to the first processor through the hub controller if the one of the number of cache lines is accessible.

25. The system of claim 22, wherein the first processor further comprises a congestion control logic to disable, for a time period, the first processor to attempt to access the data if the congestion detection logic is to detect congestion of access of the first cache line.

26. The system of claim 25, wherein the congestion control logic is to exponentially increase the time period after the congestion detection logic is to detect congestion while access to other cache lines in the cache memory.

27. A method comprising:
transmitting access requests, by a first processor, to access data in a memory;
receiving, by the first processor, a positive acknowledgment or a negative acknowledgment from a second processor that is associated with the memory based on one of the number of access requests; and
detecting congestion of the data in the memory based on receipt, by the first processor, of a consecutive number of negative acknowledgments from the second processor that exceed a first threshold, prior to receipt, by the first processor, of a positive acknowledgment from the second processor.

28. The method of claim 27 further comprising controlling access to the data in the memory if the consecutive number of negative acknowledgments, received by the first processor, exceeds the first threshold, prior to receipt of the positive acknowledgment.

29. The method of claim 28, wherein controlling access to the data in the memory comprises disabling transmitting of the access requests, by the first processor, for a time period.

30. The method of claim 29, wherein controlling access to the data in the memory comprises exponentially increasing the time period upon determining that the congestion is detected for other data in the memory while the time period has not expired.

31. A method comprising:
accessing, by at least one processor, a memory resource based on an access request;
receiving a positive acknowledgment if the memory resource is accessible;
receiving a negative acknowledgment from the memory resource if the memory resource is not accessible;
retrying accessing, by the at least one processor, of the memory resource based on a number of access requests; and
detecting congestion of the memory resource based on receipt, by the at least one processor, from the memory resource of a consecutive number of negative acknowledgments that exceed a first threshold within a time period, prior to receiving a positive acknowledgment.

32. The method of claim 31 further comprising controlling access to the memory resource if the consecutive number of negative acknowledgment, received by the at least one processor, exceeds the first threshold, prior to receipt of the positive acknowledgment.

33. The method of claim 31, wherein controlling access to the memory resource comprises disabling transmitting of the access requests, by the first processor, for a time period.

34. A non-transitory computer-readable storage medium storing instructions, which when executed by a machine, cause said machine to perform operations comprising:
transmitting access requests, by a first processor, to access data in a memory;
receiving, by the first processor, a positive acknowledgment or a negative acknowledgment from a second processor that is associated with the memory based on one of the number of access requests; and
detecting congestion of the data in the memory based on receipt, by the first processor, of a consecutive number of negative acknowledgments from the second processor that exceed a first threshold, prior to receipt, by the first processor, of a positive acknowledgment from the second processor.

35. The computer-readable storage medium of claim 34 further comprising controlling access to the data in the memory if the consecutive number of negative acknowledgments, received by the first processor, exceeds the first threshold, prior to receipt of the positive acknowledgment.

36. The computer-readable storage medium of claim 35, wherein controlling access to the data in the memory comprises disabling transmitting of the access requests, by the first processor, for a time period.

37. The computer-readable storage medium of claim 36, wherein controlling access to the data in the memory comprises exponentially increasing the time period upon determining that the congestion is detected for other data in the memory while the time period has not expired.

38. A non-transitory computer-readable storage medium storing instructions, which when executed by a machine, cause said machine to perform operations comprising:
accessing, by at least one processor, a memory resource based on an access request;
receiving a positive acknowledgment if the memory resource is accessible;
receiving a negative acknowledgment from the memory resource if the memory resource is not accessible;
retrying accessing, by the at least one processor, of the memory resource based on a number of access requests; and
detecting congestion of the memory resource based on receipt, by the at least one processor, from the memory resource of a consecutive number of negative acknowledgments that exceed a first threshold within a time period, prior to receiving a positive acknowledgments.

39. The computer-readable storage medium of claim 38 further comprising controlling access to the memory resource if the consecutive number of negative acknowledgments, received by the at least one processor, exceeds the first threshold, prior to receipt of the positive acknowledgment.

40. The computer-readable storage medium of claim 39, wherein controlling access to the memory resource comprises disabling transmitting of the access requests, by the first processor, for a time period.

41. The apparatus of claim 1, wherein the memory resource comprises nonvolatile memory.

42. The system of claim 17, wherein the memory resource comprises nonvolatile memory.

43. The method of claim 31, wherein the memory resource comprises nonvolatile memory.

44. The computer storage medium of claim 38, wherein the memory resource comprises nonvolatile memory.

45. A system comprising:
a network;
a plurality of processors connected to the network, wherein the plurality processors includes a first processor; and
system memory, wherein the system memory includes remote memory that is across the network from the first processor, wherein the remote memory includes a cache memory to store data;
wherein the first processor is configured to attempt to access the data from the cache memory based on access requests and wherein the first processor includes a congestion detection logic to detect congestion of access to the data from the cache memory based on receipt from the cache memory of a consecutive number of negative acknowledgments in response to the access requests.

46. The system of claim 45, wherein the access requests comprise retry attempts by the first processor to access the data from the cache memory.

\* \* \* \* \*